US008306648B2

(12) United States Patent
Koishi et al.

(10) Patent No.: US 8,306,648 B2
(45) Date of Patent: Nov. 6, 2012

(54) PROCESS CONTROL DEVICE, PROCESS CONTROL METHOD, AND PROCESS CONTROL SYSTEM

(75) Inventors: Takeo Koishi, Mito (JP); Yoshitomi Ookura, Mito (JP); Kiyotaka Fujii, Hitachi (JP); Teruhisa Koseki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 12/534,949

(22) Filed: Aug. 4, 2009

(65) Prior Publication Data

US 2010/0030353 A1 Feb. 4, 2010

(30) Foreign Application Priority Data

Aug. 4, 2008 (JP) ................................. 2008-201102

(51) Int. Cl.
*G06F 19/00* (2006.01)
(52) U.S. Cl. ........................................ 700/116; 700/115
(58) Field of Classification Search .................. 700/116, 700/115
See application file for complete search history.

(56) References Cited

U.S. PATENT DOCUMENTS

| 5,793,638 | A  | * | 8/1998  | Yao et al. ...................... 700/226 |
| 6,516,239 | B1 | * | 2/2003  | Madden et al. ................ 700/115 |
| 6,725,116 | B2 | * | 4/2004  | Sanada et al. ................. 700/115 |
| 7,117,061 | B1 | * | 10/2006 | McKenzie ..................... 700/116 |
| 7,228,192 | B2 | * | 6/2007  | Popplewell .................... 700/115 |
| 7,394,371 | B2 | * | 7/2008  | Green et al. ................. 340/572.1 |
| 2008/0126424 | A1 | * | 5/2008 | Koishi et al. ................ 707/104.1 |
| 2009/0069920 | A1 | * | 3/2009 | Franzen et al. .................. 700/97 |

FOREIGN PATENT DOCUMENTS

| JP | 06-144318 | 5/1994 |
| JP | 7-287729  | 10/1995 |

OTHER PUBLICATIONS

Japanese Office Action dated Jul. 24, 2012, in connection with Japanese Patent Application No. 2008-201102.

* cited by examiner

*Primary Examiner* — Mohammad Ali
*Assistant Examiner* — Sivalingam Sivanesan
(74) *Attorney, Agent, or Firm* — Antonelli, Terry, Stout & Kraus, LLP.

(57) ABSTRACT

A process control device includes a tracking controller receiving event information indicating that a product pass a predetermined location is received; a conductor unit for determining a corresponding process based on the event information; and a work instruction unit for issuing a work instruction for the product in the production line in response to the request from the conductor unit. The device further includes a work instruction past record control unit for controlling past record of the work instructions in response to an issue of the work instruction; a work instruction sequence order control unit for controlling a sequence order of the work instructions; and a work instruction sequence order storage for storing information of the sequence order of the work instructions to control the information of the sequence order of the work instructions in addition to the current location information of the product.

5 Claims, 30 Drawing Sheets

FIG.9

LAST WORK INSTRUCTION COMPLETION
SEQUENCE ORDER NUMBER INFORMATION
136

| WORK INSTRUCTION SEQUENCE ORDER ZONE ID | LAST WORK INSTRUCTION COMPLETION SEQUENCE ORDER NUMBER |
|---|---|
| 1 | 6 |
| 2 | null |
| 3 | null |
| ... | ... |

145 WORK INSTRUCTION POINT INFORMATION

| WORK INSTRUCTION POINT ID | WORK INSTRUCTION SEQUENCE ZONE ID | PRINTING DEVICE ID | FORMAT ID | INTENDED USAGE |
|---|---|---|---|---|
| WI01 | 1 | PRT001 | F01 | WELDING INSTRUCTION SHEET |
| WI02 | 2 | PRT002 | F02 | PAINTING INSTRUCTION SHEET |
| WI03 | 2 | PRT003 | F03 | PARTS ASSEMBLY INSTRUCTION SHEET |
| WI04 | 1 | PRT004 | F01 | PAINTING INSTRUCTION SHEET RESERVATION |
| ... | ... | ... | ... | ... |

FIG.13B

146 WORK INSTRUCTION FORMAT INFORMATION

| FORMAT ID | FORMAT NAME | FORMAT FILE |
|---|---|---|
| F01 | WELDING TYPE 1 | BODY1.fmt |
| F02 | WELDING TYPE 4 | PAINT4.fmt |
| F03 | ASSEMBLY TYPE 1 | TRIM1.fmt |
| F04 | ASSEMBLY TYPE 2 | TRIM2.fmt |
| ... | ... | ... |

FIG.13C

147 PRINTING DEVICE SETTING INFORMATION

| PRINTING DEVICE ID | MANUFACTURER | IP ADDRESS |
|---|---|---|
| PRT001 | HITACH | 1992.168.*.1 |
| PRT002 | HITACH | 1992.168.*.2 |
| PRT003 | AAA | 1992.168.*.3 |
| PRT004 | HITACH | 1992.168.*.4 |
| ... | ... | ... |

FIG.21A

171 EVENT-ZONE DEFINITION STORAGE UNIT

| 1711 | 1712 | 1713 | 1714 | 1715 | 1716 |
|---|---|---|---|---|---|
| EVENT ID | TRACKING ZONE ID | WORK INSTRUCTION SEQUENCE ORDER ZONE ID | PROCESS PATTERN | MOVEMENT ORIGIN ZONE | MOVEMENT DESTINATION ZONE |
| 1 | 1 | 1 | ZONE MOVEMENT | ZONE mz1 | ZONE mz2 |
| 2 | 2 | 2 | ZONE MOVEMENT | ZONE mz2 | ZONE mz3 |
| 3 | 1 | 2 | OTHER | N/A | N/A |
| 4 | 1 | 1 | OTHER | N/A | N/A |
| ... | ... | ... | ... | ... | ... |

FIG.21B

172 EVENT-PROCESS DEFINITION STORAGE UNIT

| SEQUENCE NUMBER 1721 | EVENT ID 1722 | PROCESS 1723 | SEQUENCE ORDER 1724 | PROCESS MODE 1725 |
|---|---|---|---|---|
| 1 | 1 | WORK INSTRUCTION SEQUENCE ORDER UPDATE | 1 | OPERATING |
| 2 | 1 | WORK INSTRUCTION USUAL ISSUE | 2 | WAIT — 1726 |
| 3 | 2 | WORK INSTRUCTION SEQUENCE ORDER UPDATE | 1 | OPERATING |
| 4 | 3 | INSTRUCTION ACKNOWLEDGEMENT CONFIRMING | 1 | OPERATING |
| 5 | 4 | WORK INSTRUCTION REISSUE | 1 | OPERATING |

FIG.22

185 WORK INSTRUCTION SEQUENCE ORDER INFORMATION (ZONE mz1)

| SEQUENCE NUMBER | BODY NUMBER | TRACKING MOVEMENT COMPLETION FLAG | INSTRUCTION ACKNOWLEDGEMENT COMPLETION FLAG |
|---|---|---|---|
| 1 | BODY A | COMPLETED | COMPLETED |
| 2 | BODY B | COMPLETED | COMPLETED |
| 3 | BODY C | COMPLETED | |
| 4 | BODY D | COMPLETED | |
| 5 | BODY E | COMPLETED | |
| 6 | BODY F | COMPLETED | |
| 7 | BODY G | | |
| 8 | BODY H | | |
| 9 | BODY I | | |
| 10 | BODY J | | |
| 11 | BODY K | | |
| 12 | BODY L | | |

186 WORK INSTRUCTION SEQUENCE ORDER INFORMATION (ZONE mz2)

| SEQUENCE NUMBER | BODY NUMBER | TRACKING MOVEMENT COMPLETION FLAG | INSTRUCTION ACKNOWLEDGEMENT COMPLETION FLAG |
|---|---|---|---|
| 1 | BODY X | COMPLETED | |
| 2 | BODY Y | COMPLETED | |
| 3 | BODY Z | COMPLETED | |
| 4 | BODY A | | |
| 5 | BODY B | | |
| 6 | BODY C | | |
| 7 | BODY D | | |
| 8 | BODY F | | |
| 9 | BODY E | | |

187 WORK INSTRUCTION SEQUENCE ORDER INFORMATION (ZONE mz3)

| SEQUENCE NUMBER | BODY NUMBER | TRACKING MOVEMENT COMPLETION FLAG | INSTRUCTION ACKNOWLEDGEMENT COMPLETION FLAG |
|---|---|---|---|
| 1 | BODY X | COMPLETED | |
| 2 | BODY Y | COMPLETED | |
| 3 | BODY Z | COMPLETED | |

FIG.24

19 SPECIFICATION INFORMATION STORAGE UNIT

| BODY NUMBER (191) | VEHICLE COLOR (192) | VEHICLE TYPE (193) | ... |
|---|---|---|---|
| BODY A | YELLOW | SPORTS | ... |
| BODY B | GREEN | RV | ... |
| BODY C | NAVY BLUE | RV | ... |
| ... | ... | ... | ... |

FIG.25

20 WORK INSTRUCTION PAST RECORD STORAGE UNIT

| WORK INSTRUCTION POINT ID (201) | BODY NUMBER (202) | ISSUE DATE AND TIME (203) | RECEIPT COMPLETION DATE AND TIME (204) |
|---|---|---|---|
| WI01 | BODY A | 200708081001 | 200708081010 |
| WI01 | BODY B | 200708081006 | 200708081015 |
| WI01 | BODY C | 200708081011 | 200708081020 |
| WI01 | BODY D | 200708081016 | ... |
| WI01 | BODY E | 200708081021 | ... |
| WI01 | BODY F | 200708081026 | ... |
| ... | ... | ... | ... |

VEHICLE MANUFACTURING PROCESS

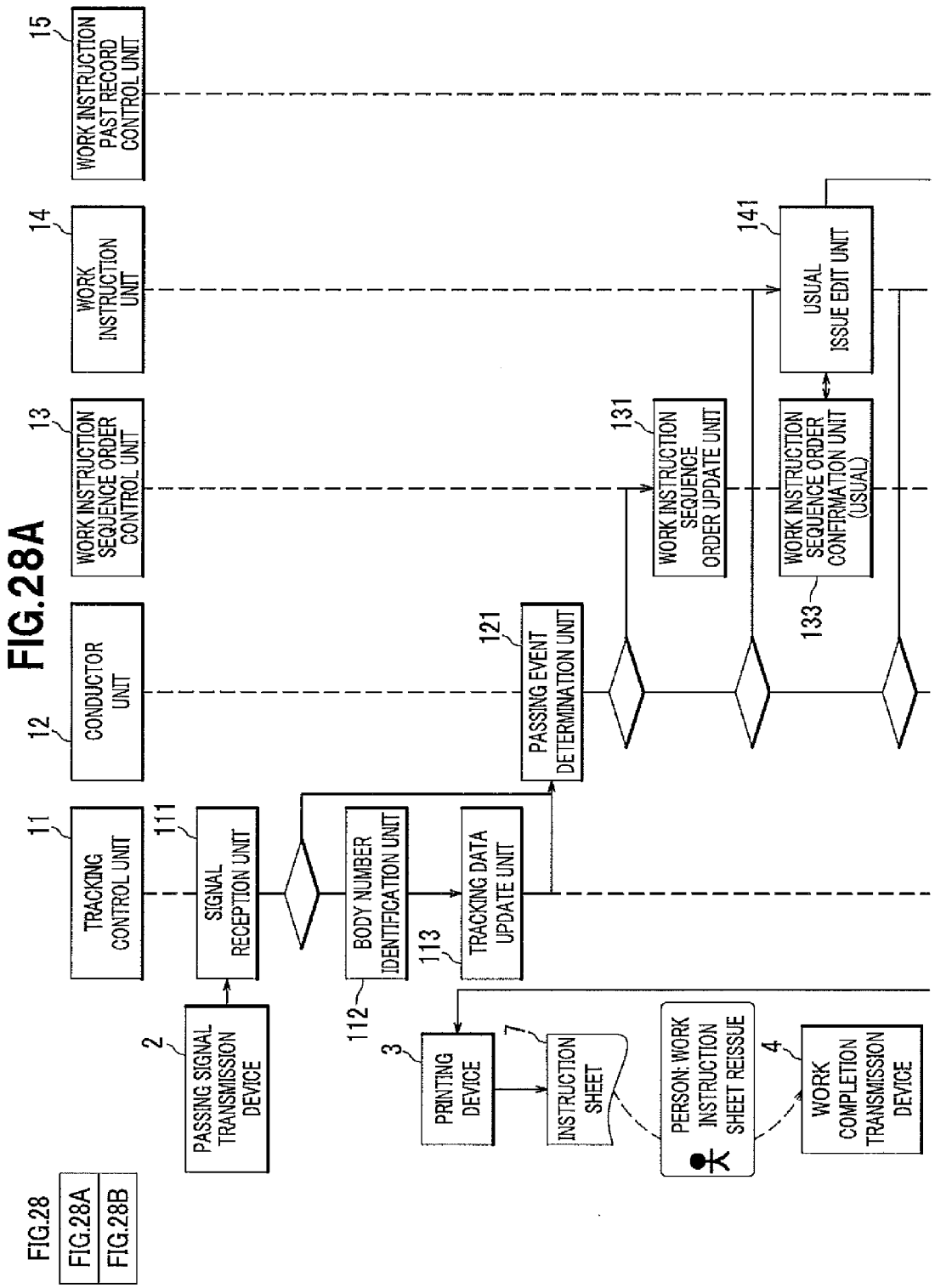

PROCESS CONTROL DEVICE, PROCESS CONTROL METHOD, AND PROCESS CONTROL SYSTEM

CROSS REFERENCE TO RELATED APPLICATIONS

This application claims the foreign priority benefit under Title 35, United States Code, §119(a)-(d) of Japanese Patent Application No. 2008-201102, filed on Aug. 4, 2008 in the Japan Patent Office, the disclosure of which is herein incorporated by reference in its entirety.

BACKGROUND OF THE INVENTION

1. Field of the Invention

The present invention relates to a process control device, a process control method system, and process control system for performing a sequence order control for location control and work instructions of products to be produced, in a production line including a plurality of production processes.

2. Description of the Related Art

In a production line for manufacturing vehicles, work is performed in a plurality of processes including a main trim line for the body which is the main part to be produced, and sub-lines for manufacturing parts, etc., such as doors and bumpers to be attached to the body and for supplying them to the main-line. In each process in these production lines, a work instruction sheet based on the product specification for the body is issued correspondingly to the body to be worked in phase with a sequential flow of the body. Then, field workers or robots for assembly work perform the work with reference to the work instruction sheet.

However, in recent years, such a production line produces a wide variety of products in a small quantity in order to meet diversified demands of the users. Therefore, location control of the product in the production process and sequence order control of the flowing products becomes important in performing work at appropriate timing.

Furthermore, in a production line which produces a wide variety of products in small quantities, products having different specifications may flow such that the products are mixed, and the sequence order of the product may be changed in accordance with the determination of the field workers. For example, the sequence order of vehicles may be changed in order to perform the work for the same vehicle type or the same body color successively. However, since work instruction sheets are issued in sequence orders that are based on production schedules coordinated in advance in conventional process control systems, it is not possible to deal with the modified sequence order at the field site. As a result of the coordination performed at the field site, in order to deal with the changed sequence order, there is a need for a system that can have accurate information about the production situation and the location of the product at the field site, plan the production schedule accordingly, and control and adjust the production situation.

JP6-144318A discloses an example of a device for correcting vehicle tracking data. The device adjusts the vehicle tracking data with the actual situation of the sequence order of the vehicle, by detecting an identification number on the vehicle with an identification number detecting device provided at an exit point in the work zone of the vehicle production process, and collates it with the vehicle tracking data that shows the sequence order of the vehicle in the work zone to detect and correct any mismatch of the vehicle.

SUMMARY OF THE INVENTION

A first aspect of the present invention provides a process control device comprising: a tracking control unit that receives event information, transmitted from the passing signal transmission device, notifying that a product being produced in a production line including a plurality of production processes passes a predetermined location, the event information including an ID of the product and controls a status of current location and sequence order of the product on the basis of the event information transmitted from the passing signal transmission device; a conductor unit that determines a process that corresponds to the ID of the product in the event information received by the tracking control unit and generates a request for performing the determined process; a work instruction unit that issues the work instruction for the product being produced in the production line in response to the request from the conductor unit; a work instruction past record control unit that controls past record of the work instructions in response to an issue of the work instruction by the work instruction unit; a work instruction sequence order control unit that controls a sequence order of the work instructions issued by the work instruction unit; and a work instruction sequence order storage unit that stores information of the sequence order of the work instructions, wherein the work instruction sequence order control unit controls the work instruction sequence order storage unit.

Thus, by having the work instruction sequence order control unit and the work instruction sequence order storage unit, the information of the sequence order of the work instruction can be controlled in addition to the information of the current location of the product which is controlled by the tracking control unit.

A second aspect of the present invention provides a method of controlling process comprising: (a) receiving event information transmitted from a passing signal transmission device, notifying that a product being produced in a production line including a plurality of production processes passes a predetermined location, the event information including an ID of the product and controls status of current location and sequence order of the product on the basis of the event information transmitted from the passing signal transmission device; (b) determining a process that corresponds to the ID of the product in the event information received at the tracking control unit and generating a request for performing the determined process; (c) issuing the work instruction for the product being produced in the production line in response to the request generated in step (b); and (d) storing and controlling information of sequence order of the issued work instructions into the work instruction sequence order storage unit; and (e) receiving a reissue request notification of the work instruction from a user, and reissuing the work instruction with reference to information of the work instruction sequence order storage unit.

A third aspect of the present invention provides a process control system comprising: a passing signal transmission device that transmits event information notifying that a product being produced in a production line including a plurality of production processes passes a predetermined location, the event information including an ID of the product; a process control device that receives the event information transmitted by the passing signal transmission device and issues a predetermine work instruction in accordance with the ID of the product; a work completion transmission device that notifies that the work instruction from the process control device has been received; a reissue requesting device that transmits event information that notifies a reissue request for reissuing the work instruction in response to a user, wherein the process control device stores and controls a status that it has been confirmed that the work instruction information has been received.

BRIEF DESCRIPTION OF THE DRAWINGS

The object and features of the present invention will become more readily apparent from the following detailed description taken in conjunction with the accompanying drawings in which:

FIG. 9 depicts a table of an example data structure showing information of the last work instruction completion sequence order number according to an embodiment of the present invention;

FIGS. 13A to 13C show an exemplary data arrangement of a storage unit connected to the work instruction unit according to an embodiment of the present invention;

FIGS. 21A and 21B show an exemplary data arrangement of the event definition storage unit according to an embodiment of the present invention;

FIG. 22 depicts an explanatory diagram showing an exemplary data arrangement of a work instruction sequence order storage unit according to an embodiment of the present invention;

FIG. 24 shows an exemplary data arrangement of a specification information storage unit according to an embodiment of the present invention;

FIG. 25 shows an exemplary data arrangement of a work instruction past record storage unit according to an embodiment of the present invention;

FIG. 28 shows a connection relation between FIGS. 28A and 28B;

FIGS. 28A and 28B depict an example of an entire process flow for a process control system according to an embodiment of the present invention.

The same or corresponding elements or parts are designated with like references throughout the drawings.

DETAILED DESCRIPTION OF THE INVENTION

Figure 1:
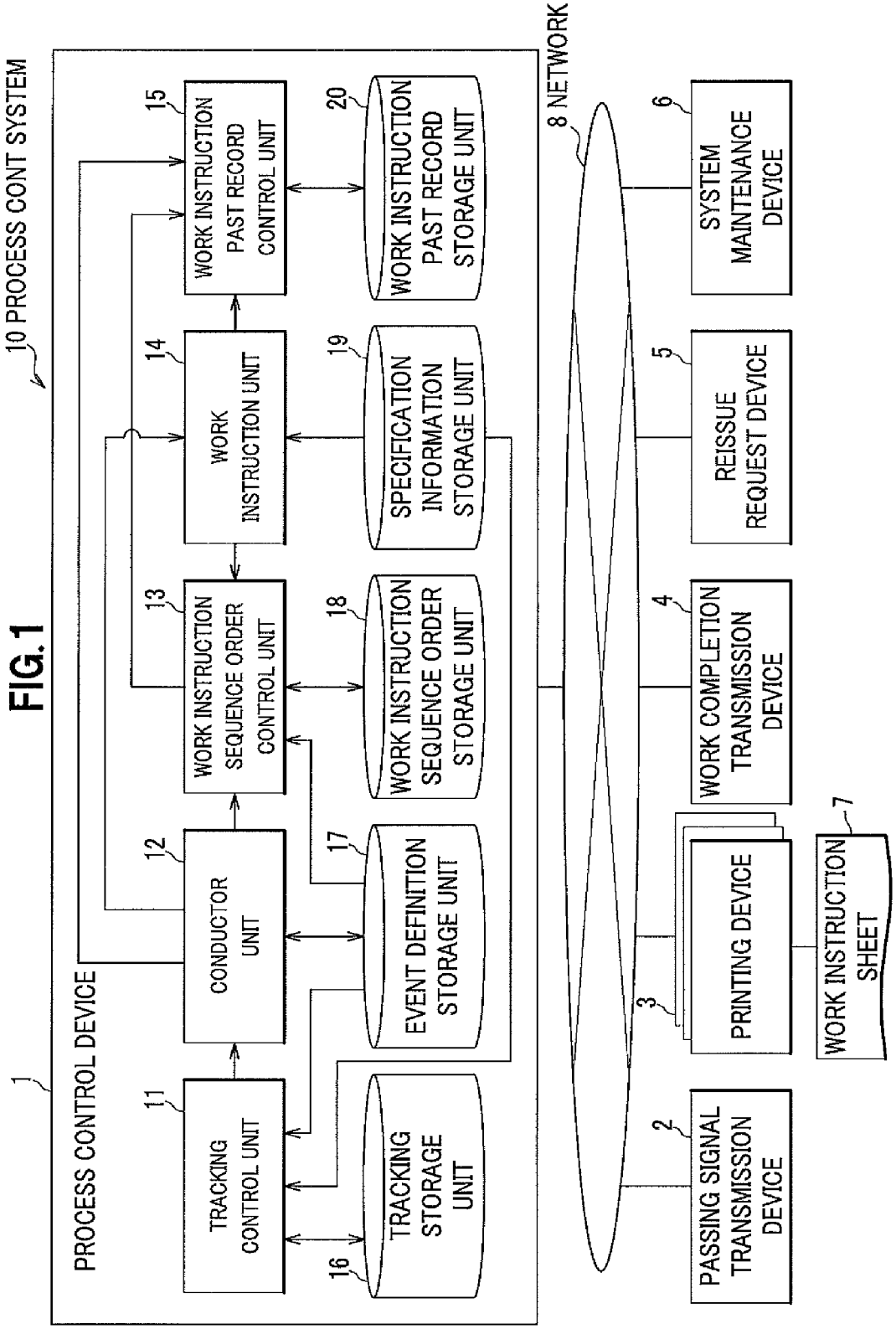
FIG. 1 depicts a block diagram of an exemplary arrangement of a system according to an embodiment of the present invention.

Prior to describing an embodiment of the present invention, the above-mentioned related art will be further explained.

In the above-mentioned related art production process for vehicles, etc., controlling the location of the body and the sequence order is carried out in real time, and the corresponding production instruction and the work instruction are carried out. In order to detect the location of the product, current location of the product can be detected by putting RFID (Radio Frequency Identification) tags which store information for identifying the product onto the product, and by reading the tag information with tag readers installed at places such as exit points of a plurality of work zones in the manufacturing line. The information regarding the location of the product in this case is called "tracking data".

Conventionally, the work instruction sheets utilized in the production process were issued based on the tracking data representing the location of the product. Furthermore, the work instruction sheets for the work in the sub-line where the production is performed in cooperation with the main production line for bodies, etc., were also issued based on the tracking data of the product in the main production line.

However, if the sequence order of the product is changed by a determination in the field site in the main production line, there is a case where the work is performed in an initially planned sequence order in the sub-line production process. In such a case, when a work instruction sheet is issued in a sequence order based on the tracking data, since it is different from the sequence order of actual work, the worker needs to confirm the product corresponding to the work instruction sheet individually. Therefore, it causes a problem in the work process. In order to resolve this problem, there is a need to issue the work instruction sheet with a different sequence order of the product in the sub-line production line from the sequence order in the main production line (tracking data).

Moreover, in a situation such as loss of, or damage to, the issued work instruction sheet, or a printing failure or issue error due to a malfunction of the printing device, there is a need for the field worker to easily reissue the work instruction sheet. Conventionally, it may be possible to reissue the work instruction sheet by requesting the issue individually for each item but it may not be possible to reissue the work instruction sheets for a selected range of products at one time.

In a device for modifying vehicle tracking data described in JP6-144318 A, the device resolves the control and display of the location and the sequence order of the product in the work process. However, the device cannot issue the work instruction, etc., in the original sequence order in addition to the tracking data in the case where the sequence order of the product is switched or for the product which has changed the sequence order after moving to the next process.

The present invention was achieved in view of the aforementioned problems, and the objective of the present invention is to provide a process control system that can issue a work instruction sheet in the initially planned sequence order in the sub-line production process, even if the sequence order of the product in the main production line is changed. Furthermore, the objective of the present invention is to provide a process control system that can issue a work instruction sheet with a sequence order which a worker requested.

In accordance with the present invention, in a case where reissue of the work instruction that was previously issued is requested when the product has already proceeded to the next process, it has become possible to reissue the work instruction in the same sequence order with the previously issued work instruction. Moreover, even if the sequence order of the product in the main production line is changed compared with the sub-line which performs work in cooperation with the main production line, since the information of the sequence order before the change can be controlled, it has become possible to issue the work instruction in the sub-line in the sequence order of the product in the main-line before the change. Furthermore, by the work instruction sequence order control unit, it has become possible to store in the work instruction sequence order storage unit and control that the work instruction has been received, together with to the sequence order of the work instruction, as the instruction acknowledgement status. Thereby, it has become possible to have knowledge of until which work instruction sheet was received at the field site, upon a replacement and an addition of a printing device, etc., that issue the work instruction sheet. Therefore, the discontinuation of the work can be reduced to a minimum at the field site.

Embodiment

Hereinafter, an embodiment of the present invention will be described with reference to the accompanying drawings.

FIG. 1 shows a process control system 10 according to an embodiment of the present invention. In the embodiment, a case where a production process is controlled in a vehicle manufacturing plant is exemplified as the process control system according to the present.

Figure 27:
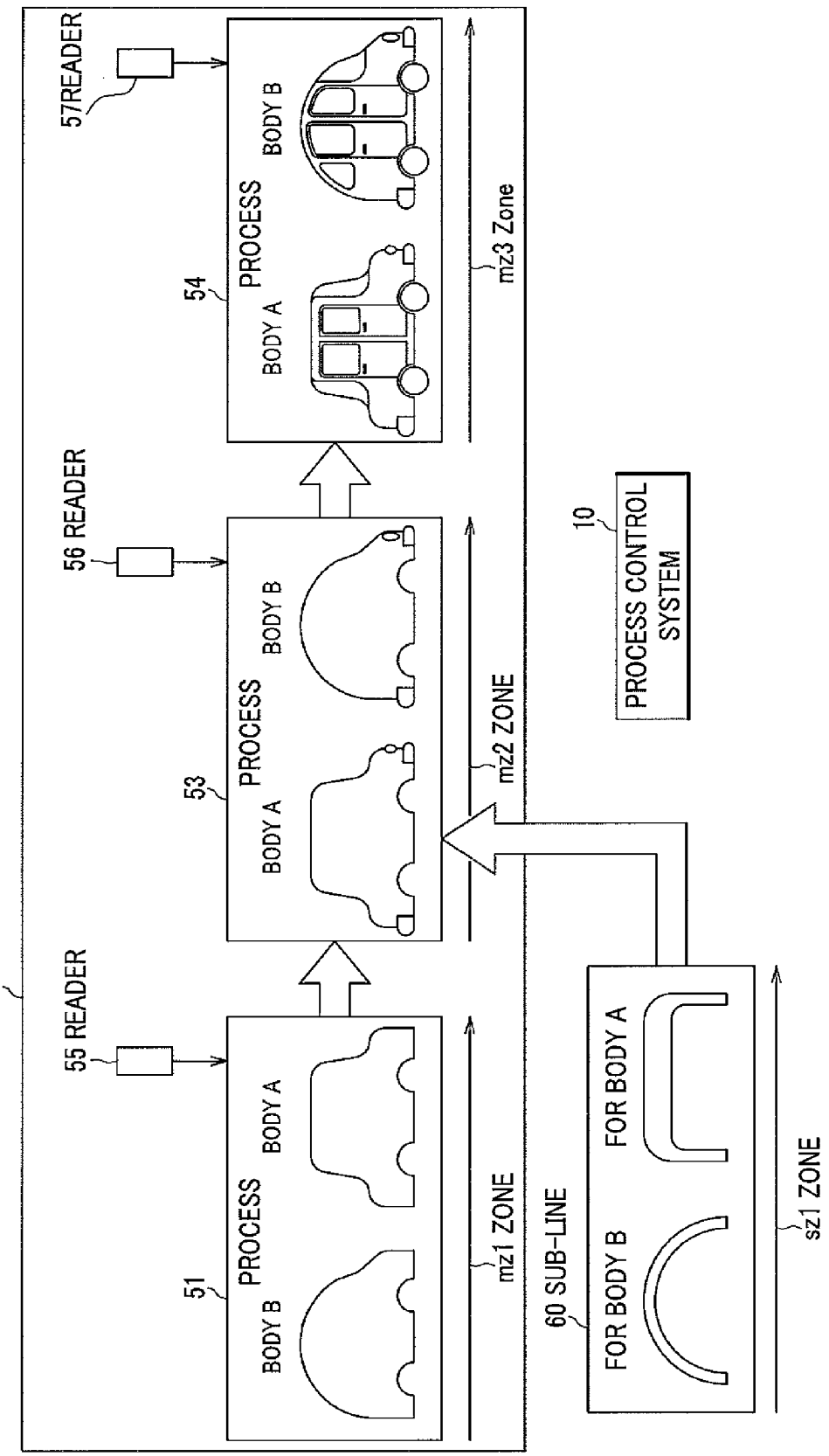
FIG. 27 schematically shows production lines in a vehicle manufacturing process.

FIG. 27 is a schematic diagram of a production line in the vehicle manufacturing process including the process control system 10 according to the embodiment. First, the production line in the vehicle manufacturing process will be schematically described with reference to FIG. 27. The vehicle manufacturing process includes a plurality of lines such as a main-line 50 for manufacturing and assembling the main parts such as a body, and a sub-line 60 for manufacturing, for example, parts that are incorporated into the body, such as bumpers. The main-line 50 is comprised of processes 51-53 and each process is called a "zone". The body to be manufactured proceeds through each process by being moved with a conveying unit such as a conveyer. An RFID tag, etc., for identifying the body is attached to the body itself or a conveying device which moves together with the body, or their adjunct. Tag information readers (reading devices) 55-57 which read RFID tag information upon the passing of the body are installed discretionally at locations in the processes, and the read information is transmitted to the process control system by a passing signal transmission device 2 provided at the reader 55 (56, 57). The reader 55 reads information stored in RFID tags, such as information regarding the body, and a reader that only detects the passing of the body. Recognizing the movement of the body, that is, recognizing the location of the product in the process, in real time based on the passing information of the body is called "tracking". Furthermore, information regarding the location of the body in the process, the sequence order of the body, etc., known based on the body passing information is called "tracking data".

The parts (products) to be manufactured in the sub-line 60 are manufactured in phase with the location, etc., of the body in the main-line 50 to be used in a predetermined manufacturing process 51, 52, or 53 in the main-line 50. Moreover, the sequence order of the parts to be manufactured in the sub-line 60 is based on the sequence order of the body flowing in the main-line 50. For example, if the sequence order of the body in a zone mz1 is body A, followed by body B, the sequence order of the manufacture of the parts in the sub-line 60 is parts for body A, followed by parts for body B. Here, we suppose that the sequence order of the body changed when the body moved into a zone mz2, which is the next process in the main-line 50, and the sequence order became body B, followed by body A. In this case, if the work in the sub-line 60 is performed after the body moved into the zone mz2, the sequence order of the work in the sub-line 60 is often unchanged and the work is done in the original sequence order as originally planned. This is because if the sequence order of the body in the main-line is changed, it is difficult to change the sequence order of the work in accordance with the sequence order in the mail line 50, since the preparation for manufacturing the parts is done in advance in the sub-line 60 also.

Next, the process control system 10 which controls the vehicle manufacturing process described above will be described with reference to FIG. 1. The process control system 10 according to the present embodiment includes a process control device 1, a passing signal transmission device 2, a printing device 3, a work completion transmission device 4, a reissue request device 5, and a system maintenance device 6, which are connected with each other via network 8.

The process control device 1 controls the product production processes 51 to 53, and issues work instructions based on the location and the sequence order of the product in the production line. The details of the process control device 1 will be described later.

The passing signal transmission device 2 reads with the reader 55 (56, 57) the information in the RFID tag attached to the body A, B, etc., and converts the information in the RFID tag to the passing signal to transmit the passing signal to the process control device 1 as an event. The passing signal transmission device 2 is installed for each process at discretionally selected locations in the production line to read the body information when the body A (B) passes through and transmits the passing signal.

The printing device 3 issues the details of the work instruction as the work instruction sheet 7 by a request from the process control device 1. A plurality of printing devices 3 are installed in accordance with the work processes in the production line. Although the work instruction from the process control device 1 is printed as a work instruction sheet and the field worker receives the work instruction in an arrangement of the present embodiment, a display device such as a terminal may be installed at the field site and the content of the work instruction may be displayed on the screen. Furthermore, robots may be installed to perform product assembly work or manufacturing work and the details of the work instruction may be provided to the robots directly.

The work completion transmission device 4 is a device for transmitting an event which notifies the process control device 1 that the worker who works in the production line at the field site has completed the work. When receiving a work instruction sheet issued from a printing device 3, the worker starts the work after attaching the work instruction sheet on the body, etc, to be worked on in order to avoid mistakes in the work. During the work, upon the completion of predetermined actions, such as receiving and attaching the work instruction sheet and finishing the work, the worker reports the work completion to the process control device 1 by manipulating devices installed in the field site, such as buttons. Although the work completion transmission device 4, which has a push button for the field worker to notify upon the work completion, is installed near the field worker in the present embodiment, it may have other notification means. For example, a symbol on a screen may be selected for the notification in a case where the work instruction is displayed in the screen of the display device.

The reissue request device 5 is a device for the worker to transmit to the process control device 1 an event for notifying a request to reissue the work instruction sheet. The worker requests the reissue of the work instruction sheet 7 to the process control device 1 in such a case where the worker could not receive the work instruction sheet 7 due to a malfunction of the printing device 3, etc., the worker lost the received work instruction sheet 7, or the worker was unable to read the work instruction sheet 7 due to damage, etc. As to the reissue request device 5, a device having a push button for the worker to use upon requesting a reissue may be installed near the field worker or the printing device 3. The device requests a reissue of a work instruction sheet that was issued immediately before, and requests a reissue of a plurality of work instruction sheets of work which has not yet been completed. However, the device may include other notification unit. For example, the reissue of the work instruction sheet may be requested by a user, such as a worker or a system manager by selecting and instructing an item name to be reissued after displaying it on, for example, a screen or a menu in a personal computer, etc.

The system maintenance device 6 is a device for the system manager, etc., to perform operations, such as changing the specifications of the process control system, enhancing system capability or refurbishing the system in accordance with, for example, addition of a printing device or a change in the number of process lanes. Furthermore, the system maintenance device 6 performs manipulations such as adding, updating, and deleting information in the storage unit housed in the process control device 1. The system maintenance device 6 is a device including a terminal for connecting to the process control device 1 and performing maintenance of the process control device 1 by implementing a program, etc., for accomplishing the maintenance function in a personal computer, etc.

The network 8 includes communication lines such as an intranet which connects devices installed in an operation room, devices installed in a field site, etc. The data communication between the devices may be wireless, and communication devices for wireless communications may be included in each device instead of the network 8.

Next, an exemplary internal arrangement of the process control device 1 will be further described with reference to FIG. 1. The process control device 1 includes a tracking control unit 11, a conductor unit 12, a work instruction sequence order control unit 13, a work instruction unit 14, and a work instruction past record control unit 15. Furthermore, it includes a tracking storage unit 16, an event definition storage unit 17, a work instruction sequence order storage unit 18, a specification information storage unit 19, and a work instruction past record storage unit 20, which store data necessary for the processes in the control units.

The tracking control unit 11 receives an event of the passing signal transmitted from the passing signal transmission device 2 in the process line, updates tracking information that represents the location and the sequence order of the body in the process line based on the received passing signal, and controls the progress of the process. The collected tracking information is stored in the tracking storage unit 16.

The conductor unit 12 issues the work instruction in accordance with the progress of the process, which is controlled by the tracking control unit 11, and records and controls the relationship between the zone which indicates the control segment of the process and events concerning, for example, a passing signal, completion notification, and a reissue request, which are transmitted from the process. Furthermore, it receives each event and executes a process in accordance with the event. The information which the conductor unit 12 refers to is stored in the event definition storage unit 17. Examples of the information include information which defines a relationship between the events reported from the process and the tracking zone that shows the control segment of the process, and the information which defines a relationship between the transmitted event and the type of the process which instructs the conductor unit 12.

The work instruction sequence order control unit 13 controls the issue sequence order of the work instruction in addition to the progress of the process for controlling the tracking control unit 11. Furthermore, the work instruction sequence order control unit 13 controls the work instruction sequence order storage unit 18 which stores the work instruction sequence order and the work instruction situation for each zone.

The work instruction unit 14 creates the work instruction sheet in a predetermined format according to the sequence order of the work instruction in response to the request from the conductor unit 12, and requests for printing the work instruction sheet are sent to a preset printing device. Moreover, the event of the reissue request transmitted from the reissue request device 5 is forwarded to the conductor unit 12 via the tracking control unit 11, and the work instruction unit 14 reissues the work instruction sheet in response to a request from the conductor unit 13. Upon creating the work instruction sheet, the specification information storage unit 19, which stores the specifications of the bodies, is referenced to create an instruction sheet based on the specifications of the body.

When the work instruction unit 14 issues a work instruction sheet, the work instruction past record control unit 15 controls the past record and stores the past record information of the work instruction to the work instruction storage unit 20. The event of the work completion notification issued from the work completion transmission device 4 is forwarded to the conductor unit 12 via the tracking control unit 11, and the work instruction past record control unit 15 stores the work completion information into the work instruction past record storage unit 20.

Now, an exemplary data arrangement in each storage unit of the process control device 1 according to the present embodiment will be described.

Figure 19:
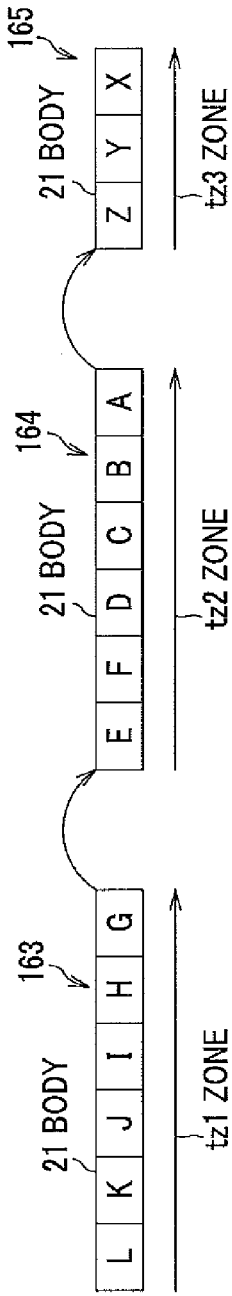
FIGS. 19A and 19B depict an exemplary data arrangement of a tracking storage unit according to an embodiment of the present invention.

FIGS. 19A and 19B show an example of a data arrangement in the tracking storage unit 16. The tracking storage unit 16 stores tracking information for managing the location and the sequence order of the body to be manufactured in real time. In the present embodiment, the processes in the production line are divided into a plurality of control segments and they are referred to as "zones". Each of the zones mz1 to mz3 is provided with an ID for identification and it is referred to as "zone ID". Furthermore, the zone for controlling the tracking information for knowing the location of the body is referred to as "tracking zone" tz1 to tz3. The tracking storage unit 16 registers information of each of the bodies A and B and the sequence order at each of the tracking zones tz1 to tz3, which body locates in the zone.

FIG. 19A shows an example of the details of the data registration of the tracking information for each zone. In FIG. 19A, an example is shown for tracking information 163 of zone mz1, tracking information 164 of zone mz2, and tracking information of zone mz3. Each arrangement for the tracking information includes serial number 161 for registering a serial number representing the sequence order of the residing body, and a body number 162 which is registered with a residing body number, to form a single record.

FIG. 19B shows an arrangement in a line in tracking zones tz1 to tz3, which shows a situation in the process. In FIG. 19B, the bodies proceed as shown in the arrows shown in the figure, so that the bodies proceed in a sequence order, zone mz1, and zone mz2, followed by zone mz3. For example, body G that locates at the forefront in the production process 51 is registered to the serial number 1 of the tracking information of zone mz1 and its body proceeds to the next zone mz2.

In the production process, the sequence order number of the body may be changed upon moving the zone by the determination of the field worker. For example, there is a case where the sequence order of body E and body F changes when the tracking zone moves from zone mz1 to zone mz2, from an order in zone mz1, body E, followed by body F to an order in zone mz2, body F, followed by body E. No matter how the sequence order changes, it becomes possible to know correctly the current location of the body located in the zone by moving the body information between the tracking zones.

Figure 20:
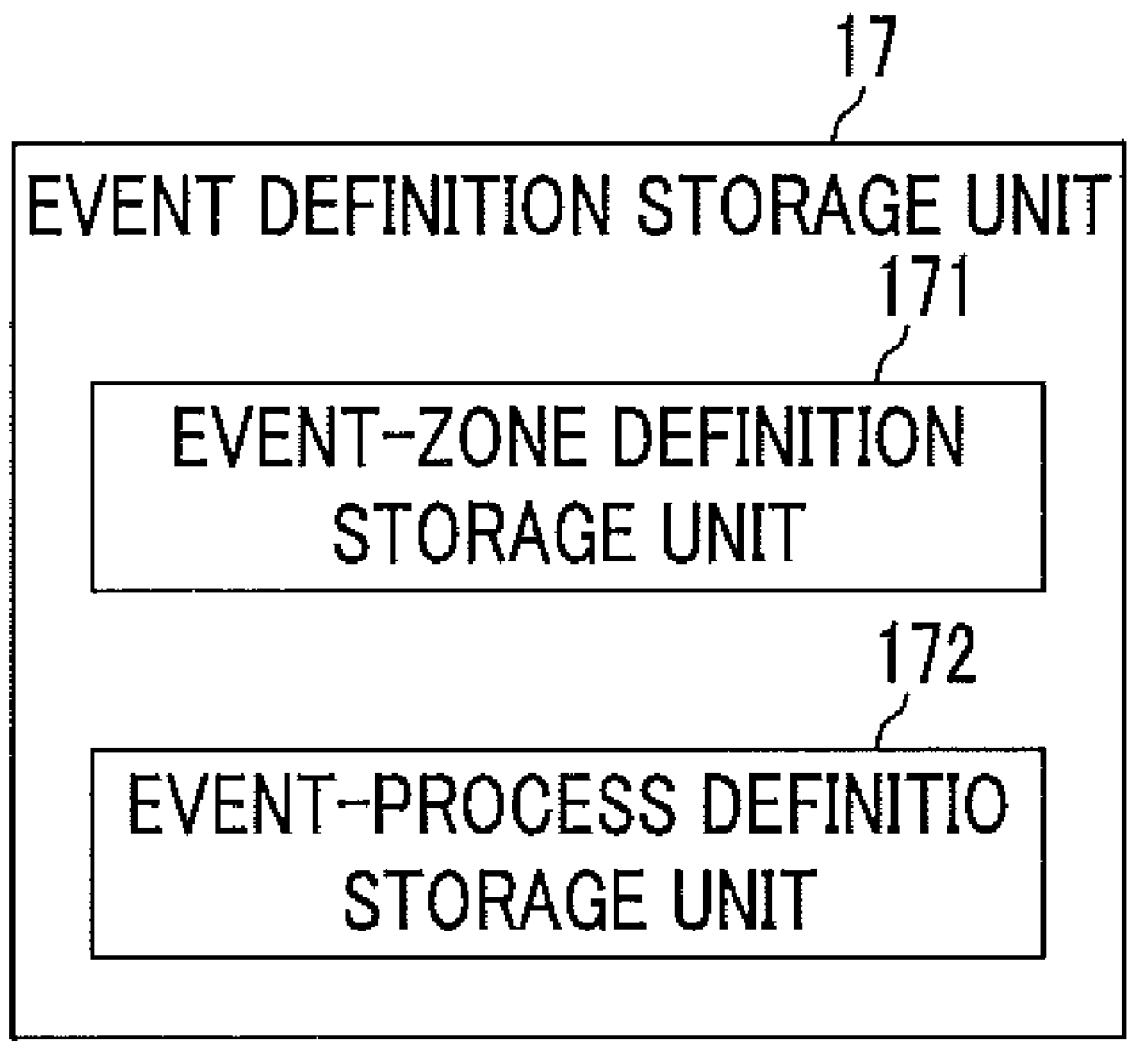
FIG. 20 shows an exemplary schematic arrangement of an event definition storage unit according to an embodiment of the present invention.

FIGS. 20 and 21 show an example of a structure of the event definition storage unit 17. The event definition storage unit 17 stores information related to the event and the tracking zone transmitted from the production process, and event information for controlling the content of the process performed in accordance with the event, for example. FIG. 20 is a diagram schematically showing an arrangement of the event definition storage unit 17. The event definition storage unit 17 includes an event-zone definition storage unit 171 and an event-process definition storage unit 172. In the event-zone definition storage unit 171, the relationship between the event transmitted from the production line 50 and the zone to which the originator of the event belongs is registered. In the event-process definition storage unit 172, the sequence order of the process and the operation which operate in accordance with the event, and the process mode which shows the operating status of the process are registered.

FIG. 21A shows an example of a format of the event-zone definition storage unit 171. The event-zone definition storage unit 171 includes an event ID 1711, a tracking zone ID 1712, a work instruction sequence order zone ID 1713, a process pattern 1714, a movement origin zone 1715, and a movement destination zone 1716, to form a single record. The event ID 1711 is registered with an ID which identifies the event. The tracking zone ID 1712 registers IDs of the tracking zone which the event originates. The work instruction sequence order zone ID 1713 is registered with an ID of the work instruction sequence order zone to which the event belongs. The process pattern 1714 is registered with a pattern of the process which corresponds to the event. The movement destination zone 1715 and the movement destination zone 1716 register the tracking zone of the movement origin and the tracking zone of the movement destination if the process pattern is "zone movement". It is noted that the movement destination zone 1715 and the movement destination zone 1716 are valid only in the case where the process pattern is "zone movement".

FIG. 21B shows an example of a format in the event-process definition storage unit 172. The event-process definition storage unit 172 includes a sequence order number 1721, an event ID 1722, a process 1723, a sequence order 1724, and a process mode 1725, to form a single record. The sequence order number 1721 is registered with an identification number which becomes a key of the definition. The event ID 1722 is registered with an ID which identifies an event. The process 1723 registers a process to associate with the event ID in a process which operates in accordance with the event. It is noted that a plurality of processes can be registered for a single event ID. The sequence order 1724 registers the sequence order number of the process which operates for each event ID, and the process sequence order in a case where a plurality of processes were registered to the same event ID is shown. The process mode 1725 sets the operating situation of the process. For example, the process mode 1726 of the "work instruction usual issue" for the sequence order number 2 is set to "WAIT". In this case, the process mode 1726 shows a situation where some error occurred in the printing device of the issue destination for the work instruction sheet or a situation where the work instruction sheet cannot be printed out due to the replacement work of the facilities, etc., and in the case where such an event occurred, the present process will not be operated. Thus, the information related to an event which occurs in the production process is registered in the event definition storage unit 17 for controlling it.

FIG. 22 shows an example of data in the work instruction sequence order storage unit 18, i.e., work instruction sequence order information for each zone. The work instruction sequence order storage unit 18 registers the work instruction sequence order which controls the sequence order to instruct the work, in addition to the tracking storage unit 16 which controls the residing location of the manufacturing body. In the work instruction sequence order storage unit 18, the sequence order to issue the work instruction sheet which relates to the body to instruct the work is registered for each zone (herein referred to as a "work instruction sequence order zone").

FIG. 22 shows work instruction sequence order information for each zone including: the work instruction sequence order information 185 of zone mz1, the work instruction sequence order information 186 of zone mz2, and the work instruction sequence order information 187 of zone mz3, as an example of the details of the registration for the work instruction sequence order information for each work instruction sequence order zone. Each work instruction sequence order information includes a sequence order number 181 which represents the sequence order of the residing body, a body number 182 registering the residing body number, a tracking movement completion flag 183 which identifies the objective body is already moved to another tracking zone, and an instruction acknowledgement completion flag 184 which identifies that the result of the work instruction issue is received by the worker, to form a single record. For example, in the work instruction sequence order information 185 for zone mz1, which is a first zone in the production process, sequence order numbers 181 of 1-12 are registered and bodies A-F among those having the sequence order 1-6 represent that the movement to the next zone mz2 is completed. In the work instruction sequence order information 186 for the next zone mz2, the sequence order numbers 181 of 1-9 are registered and bodies X-Z for 1-3 of those represent the movement into the next zone mz3 is completed. In the next zone mz3, bodies X-Z are registered.

If it is assumed that only the tracking control unit 11 and tracking storage unit 16 are provided, since only the information for the current residing location information of the body is held, if the sequence order, etc., of the body changed, the work instruction sheet cannot be issued again in the same sequence order as issued previously. On the other hand, because in the present embodiment, the past sequence order information for the body which passed each zone can also be maintained by including the work instruction sequence order control unit 13 and the work instruction sequence order storage unit 18. For example, if the tracking movement completion flag 183 of the work instruction sequence order information is "completed", the work instruction sequence order information of the body is maintained. Therefore, in a case where the work instruction sheet is to be reissued, it can be issued in a similar sequence order to the sequence order issued previously.

Furthermore, the instruction acknowledgement completion flag 184 becomes "completed" by the field worker notifying the work completion with the work completion transmission device after receiving the work instruction sheet. Thereby, those that have not completed the issue of the work instruction sheet can be easily determined. Therefore, if there is a work instruction sheet which could not be issued due to a reason such as a malfunction of the printing device 3 and a replacement of the device, the work instruction sheet for the currently working vehicle can be determined and issued in the same sequence order with the work instruction.

Figure 23:
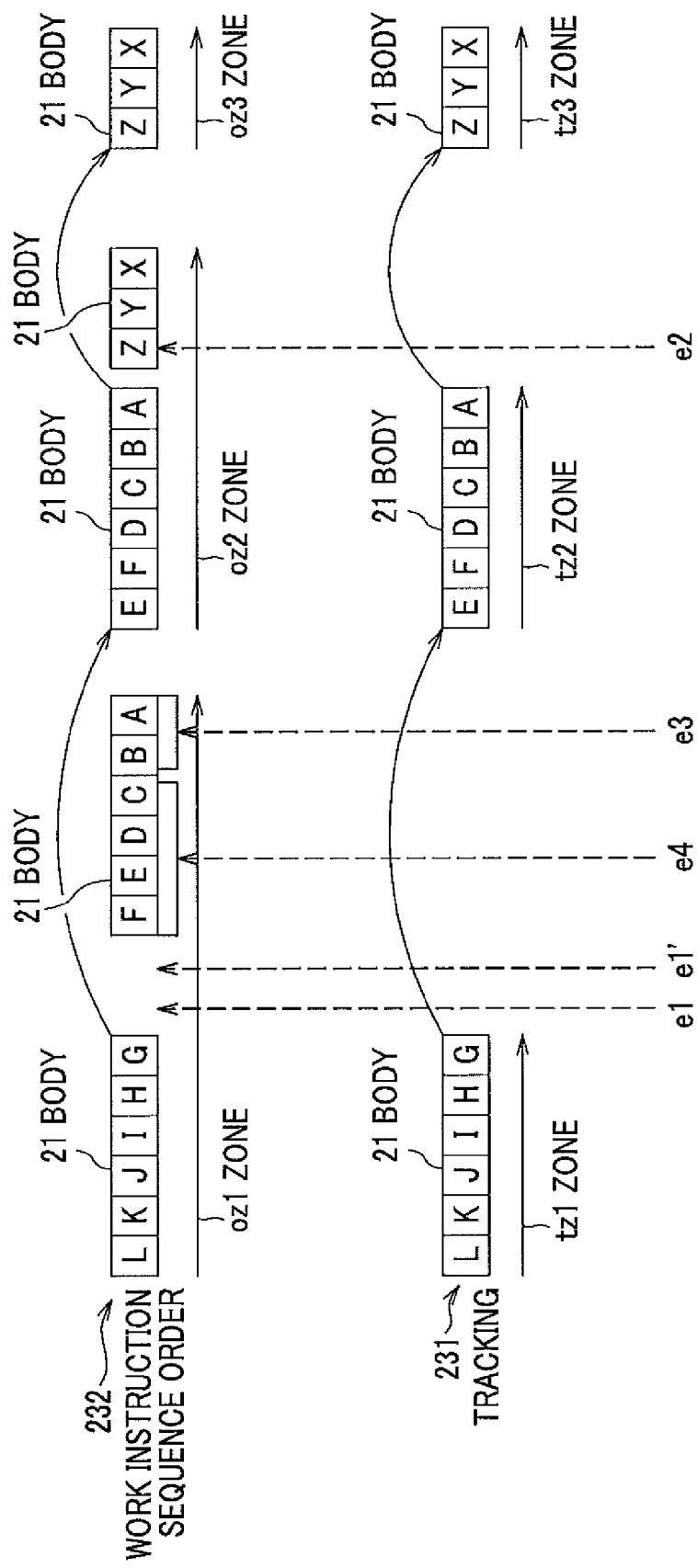
FIG. 23 shows a relationship between the tracking zone, the work instruction sequence order zone, and the event according to an embodiment of the present invention.

FIG. 23 shows a relationship among the tracking zones, work instruction sequence order zones, and events on the basis of the tracking information which is controlled at the tracking storage unit 16, the event information which is controlled at the event definition storage unit 17, and the work instruction sequence order zone which is controlled at the work instruction sequence order storage unit 18. The tracking zone represents the progress of the production process which was already described in FIG. 19, and it represents the sequence order of the body which is located in each of the zones in the production line. An example of the tracking information for each zone is shown in "tracking" 231 in FIG. 23. An example of the work instruction sequence order information is shown in work instruction sequence order 232 in FIG. 23, and the sequence order of the body for each zone is shown including the body already moved to the next zone. Therefore, the information of the body which belongs to the work instruction sequence order zones oz1 to oz3 are greater in quantity than the information of the body in the tracking zones tz1 to tz3.

An example of the event information is shown in event e1—event e4 in FIG. 23. The event e1 represents a work instruction usual issue, and the event e1' represents a work instruction sequence order update. The event e2 represents a work instruction sequence order update. The event e3 represents instruction acknowledgement confirmed. The event e4 represents a work instruction reissue.

For example, when the sequence order of body E and body F is changed upon moving from zone mz1 to zone mz2, the line order of the body in the tracking zone mz2 is body F, followed by body E. Here, upon event e4, if the work instruction sheet during the period when the body is located in zone mz1 is to be reissued, the work instruction sheet cannot be issued in the original sequence order since the tracking information to be referred is moved. The sequence order of the body at the time of the reissue can be guaranteed by retaining the condition prior to the movement continually in the work instruction zone.

Further in a case where FIG. 23 shows bodies in the main-line and the work in the sub-line is performed in cooperation with the main-line, there may be cases where the work instruction sheet in the sub-line must be issued with the sequence order prior to the movement even if the sequence order of the body in the main-line has changed upon moving into zone mz2. Even in such a case, the work instruction sheet in the sub-line can be issued with the original sequence order by referring to the work instruction sequence order information in addition to the tracking information.

FIG. 24 is an example of a data structure of the specification information storage unit 19. The specification information storage unit 19 stores specification information for controlling fundamental specifications such as the color of the body to be manufactured, vehicle type, etc. Specification information storage unit 19 includes a body number 191 which is a number for identifying the body, a vehicle color 192 in which the color of the body is registered, a vehicle type 193 for the body, etc. Other specifications for the body may be registered discretionally.

FIG. 25 shows an example of a data structure of the work instruction past record storage unit 20. In response to that the work instruction sheet issue process is performed by the work instruction unit 14 normally, the work instruction past record control unit 15 stores data shown in FIG. 24 as history T in the work instruction past record storage unit 20. The work instruction past record storage unit 20 includes a work instruction point ID 201 which identifies the point where the work was instructed, an issue date and time 203 in which the issue date and time is registered, and a "receipt-completed" date and time in which the date and time the worker received the work instruction sheet is registered, to form a single record.

The above description describes an example of data structures in respective storage units which are the database of the process control device 1 according to an embodiment of the present invention. Next, the details of the processing units of the process control device 1 will be described.

Figure 2:
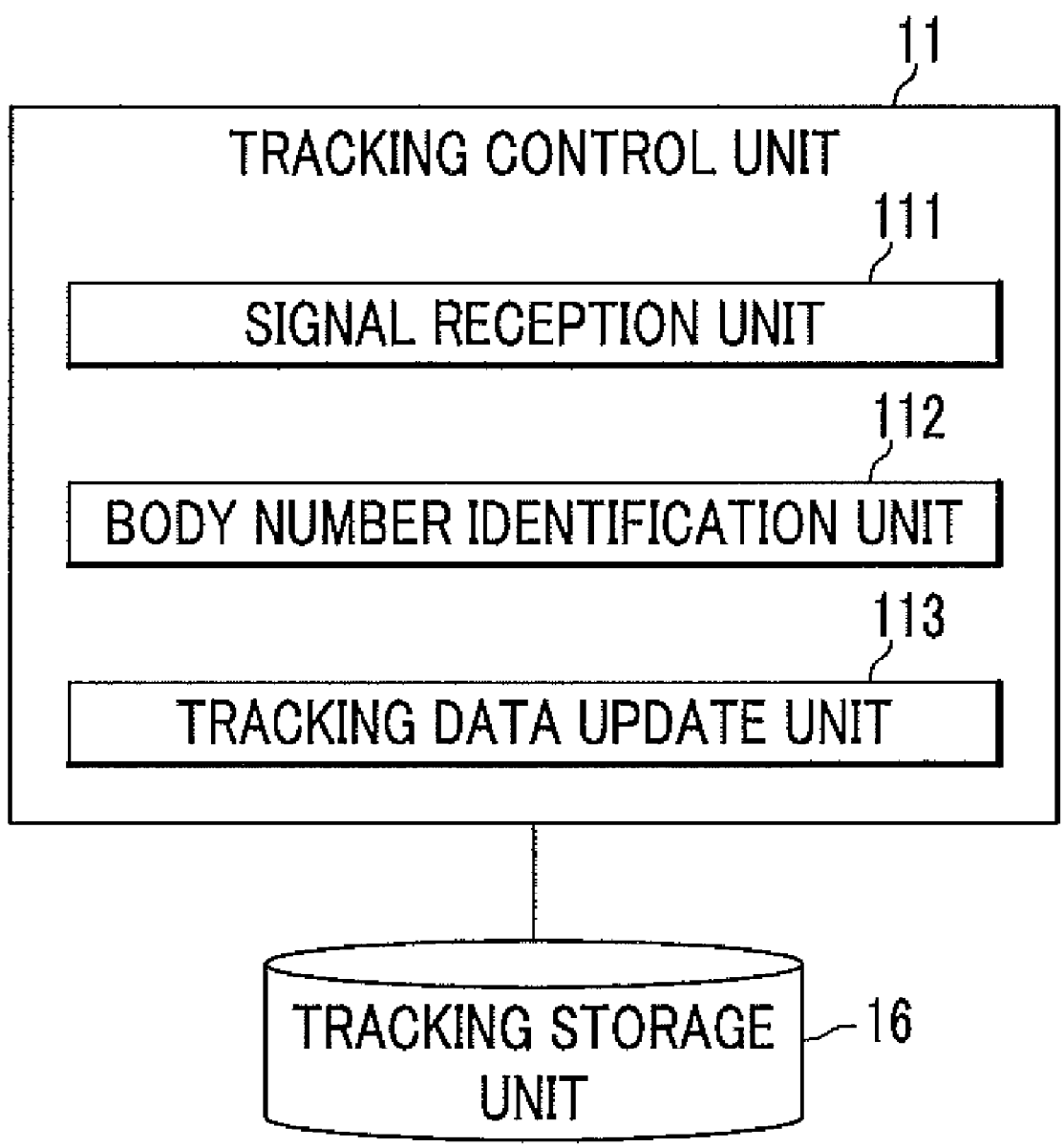
FIG. 2 depicts a block diagram showing an exemplary schematic arrangement of a tracking control unit according to an embodiment of the present invention.

FIG. 2 is a diagram schematically showing an exemplary arrangement of the tracking control unit 11. The tracking control unit 11 includes a signal reception unit 111, a body number identification unit 112, and a tracking data update unit 113. The tracking control unit 11 reads the body number from an RFID attached to the body of the vehicle, or the manufacturing platform, etc., by a reader in the passing signal transmission device 2 provided in the production line, and receives the passing signal transmitted by the signal reception unit 111 via the network 8. Then, the body in the process is identified based on the received passing signal at the body number identification unit 112. Thereafter, the tracking data update unit 113 controls the residing zone and the sequence order of the body in the process from the identified body, and updates the information of the tracking storage unit 16. The details of each process will be described hereinafter.

Figure 3:
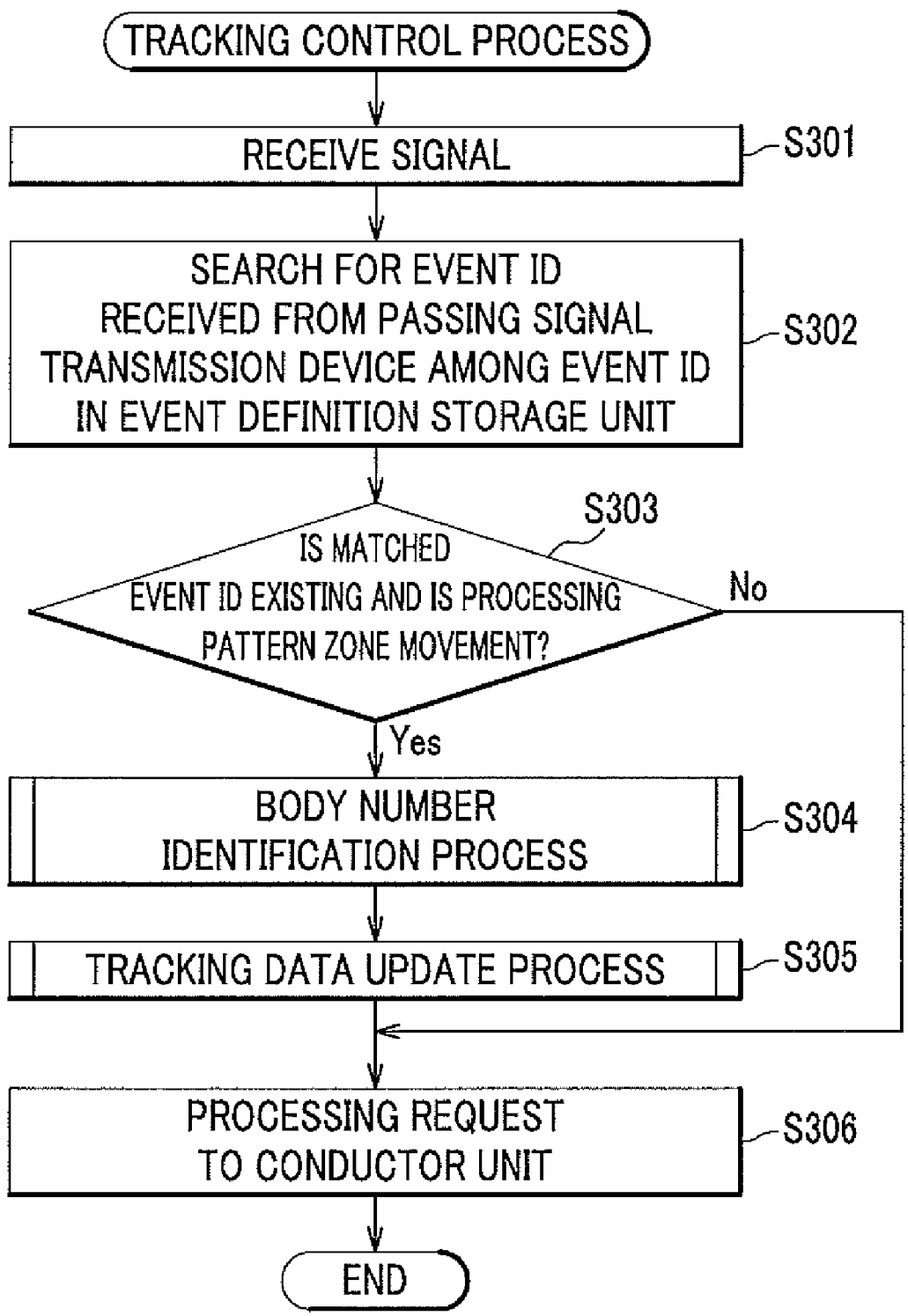
FIG. 3 depicts a flowchart showing an example of a tracking control process according to an embodiment of the present invention.

FIG. 3 is a flowchart showing an exemplary tracking control process performed by the tracking control unit 11. First, the signal reception unit 111 receives a passing signal transmitted from the passing signal transmission device 2 via the network 8 (step S301). The received passing signal includes information such as an event ID and a body number as information of the body that passed through the process. In order to confirm whether the event ID of the received passing signal is a correct event or not, a search is performed to find information that corresponds to the received event ID in the event zone definition storage unit 17 of the event-zone definition storage unit 171 (step S302).

Figure 4:
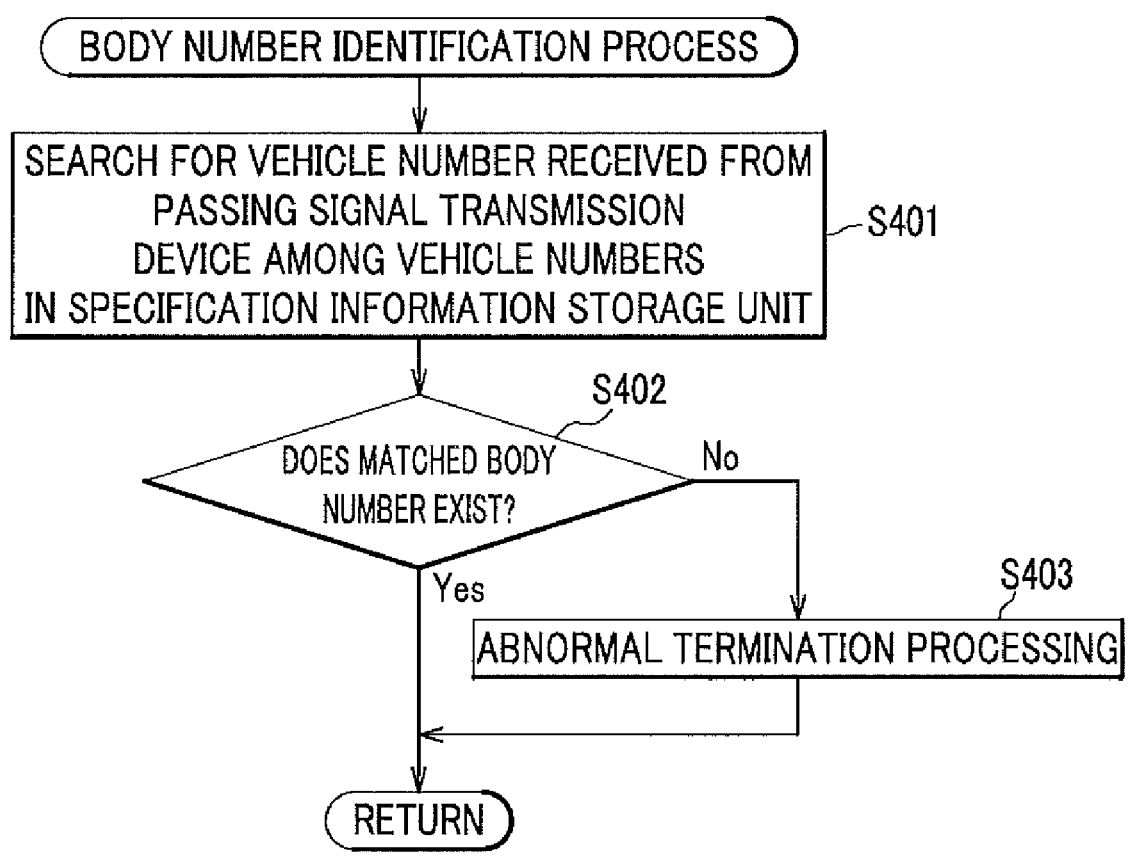
FIG. 4 depicts a flowchart showing an exemplary body number identification process according to an embodiment of the present invention.
Figure 5:
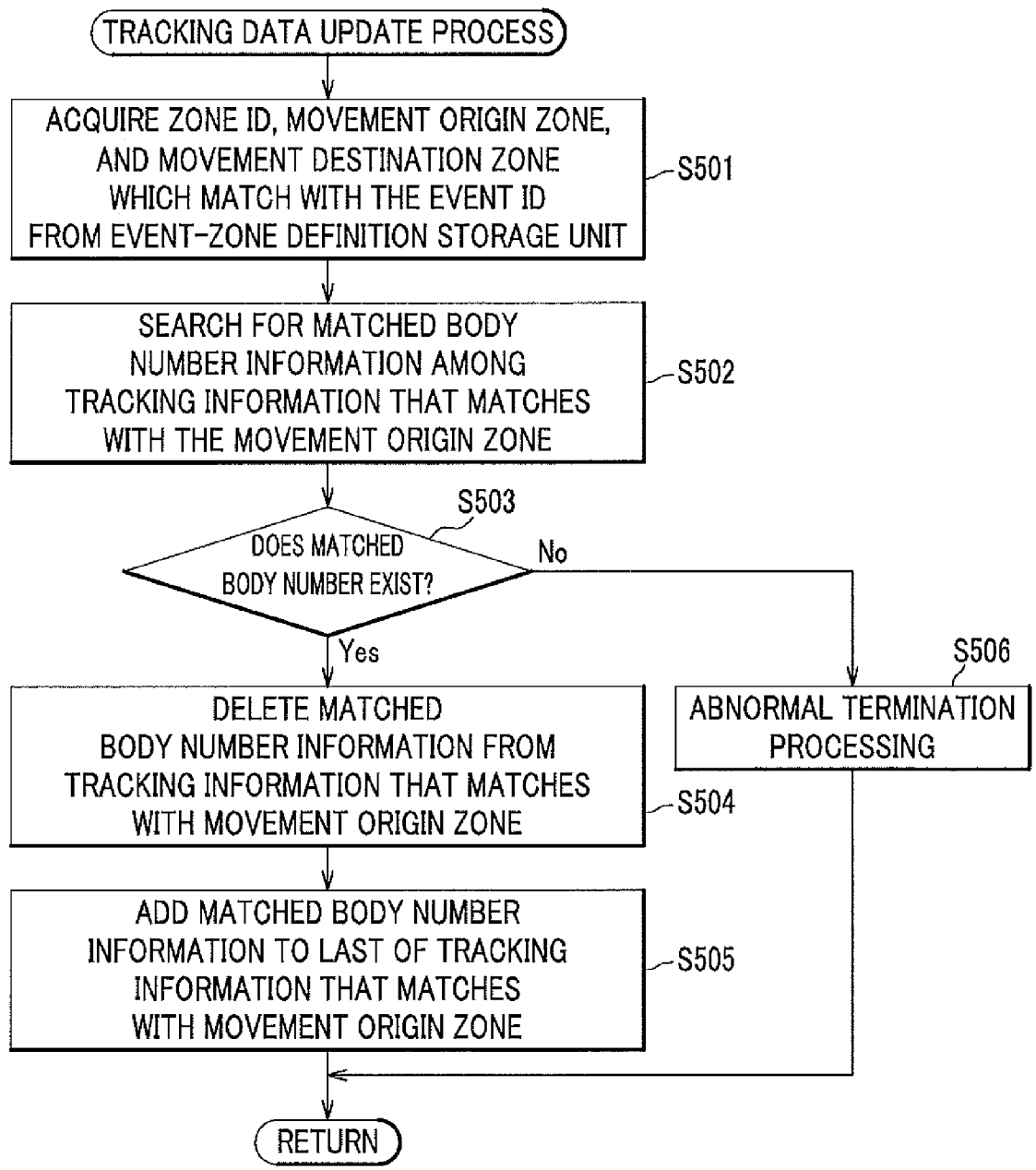
FIG. 5 depicts a flowchart showing an exemplary tracking data update process according to an embodiment of the present invention.

Next, it is determined whether there is information for the matched event ID and whether its process pattern is zone movement or not, as a result of the search (step S303). As a result of the determination, if there is matched information, the body number identification process is performed by the body number identification unit 112 (step S304). The detail of the body number identification process is shown in FIG. 4. Then, a tracking data update process is performed by the tracking data update unit 113 (step S305). The details of the tracking data update process is shown in FIG. 5. Finally, the event ID and the body number are passed onto the conductor unit 12 to request processing (step S306) and the process ends. As a result of the determination made in step S303, if there is no corresponding information, the process proceeds to step S306 and requests the processing to the conductor unit 12, and the process ends.

FIG. 4 is a flowchart showing an example of a body number identification process performed by the body number identification unit 112. First, the body number identification unit 112 searches the specification information storage unit 19 for matched information based on the body number of the passing signal received from the specification information storage unit 19 (step S401). As a result of the search, whether there is information for the matched body number or not is determined (step S402). As a result of the determination, if there is information for the matched body number, the process returns to step S304 for the tracking control process, which called the present process. As a result of the determination made in step S402, if there is no information for the matched body number, abnormal termination processing is performed (step S403) and the process ends.

FIG. 5 is a flowchart showing an example of a tracking data update process by the tracking data update unit 113. First, the tracking data update unit 113 inputs an event ID of the passing signal received from the passing signal transmission device 2, refers to the event-zone definition storage unit 171 of the event definition storage unit 17, and acquires the information for the tracking zone ID 1712, the movement origin zone 1715 and the movement destination zone 1716 that match with the event ID (step S501). Then, the tracking data update unit 113 refers to the tracking storage unit 16, and searches for the corresponding body number from the tracking information of the zone that matches with the acquired movement origin zone ID (step S502).

Next, from a result of the search, whether there is a matched body number or not is determined (step S503). If there is a body number, the information related to the matched body number, that is, the record that includes the corresponding body number, is deleted from the tracking information that matches with the movement origin zone ID (step S504). Then, the information for the corresponding body number is added to the end of the tracking information for the zone that matches with the acquired movement destination zone ID. The serial number 161 of the record to be added is a value obtained by adding one to a maximum value of the current serial numbers (step S505). After ending the processing, the process returns to step S305 for the tracking control process, which required the present process. As a result of the determination made in step S503, if there is no corresponding number, abnormal termination processing is performed (step S506), and the process ends.

Figure 6:
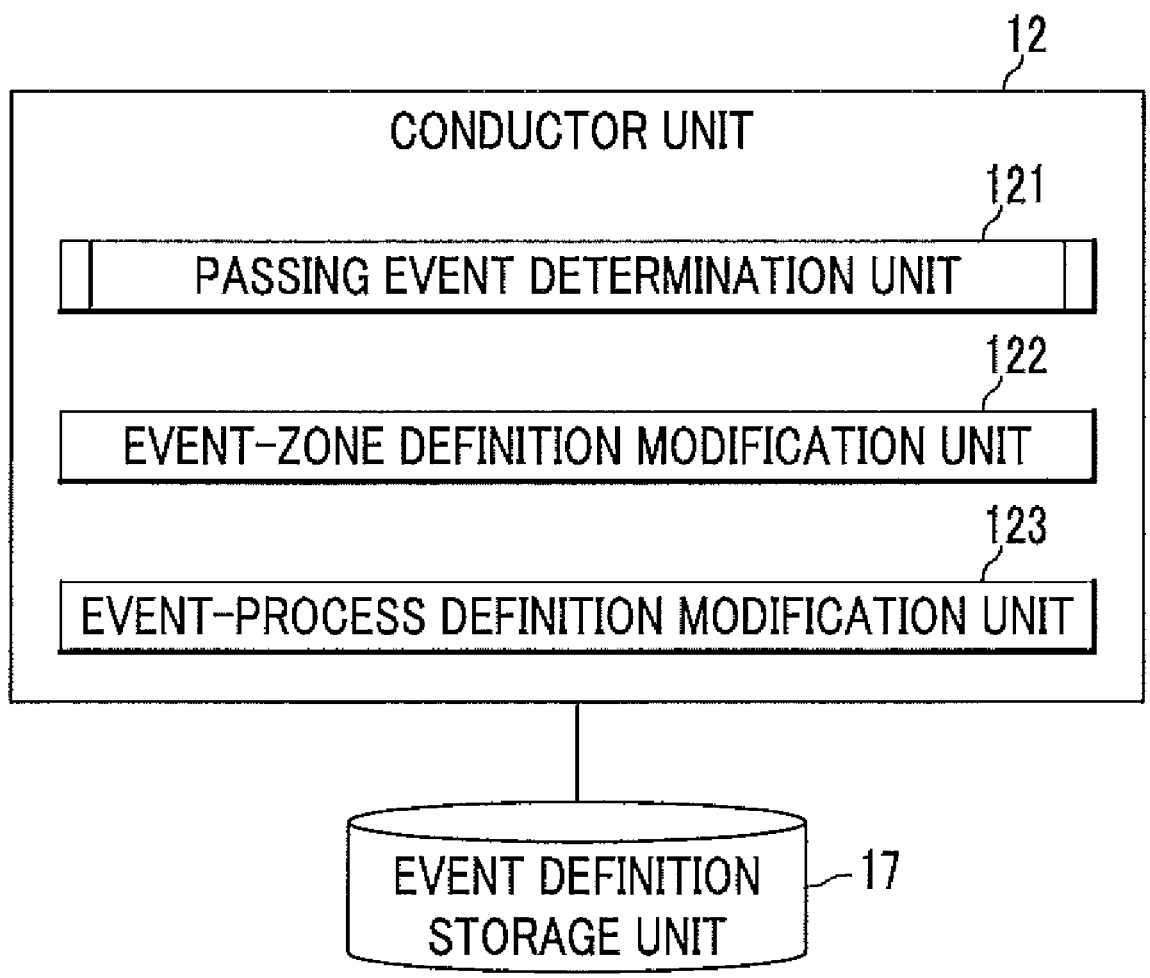
FIG. 6 depicts a block diagram showing an exemplary schematic arrangement of a conductor unit according to an embodiment of the present invention.

FIG. 6 is a diagram schematically showing an example of a structure of a conductor unit 12. The conductor unit 12 handles the process which should be performed upon the event which the tracking control unit 11 received in response to a processing request from the tracking control unit 11. The conductor unit 12 includes a passing event determination unit 121, an event-zone definition modification unit 122, and an event-process definition modification unit 123. The process of the conductor unit 12 during a normal operation in the production line is performed by the passing event determination unit 121. On the other hand, the event-zone definition modification unit 122 and the event-process definition modification unit 123 perform a process to update the content of the event definition storage unit when the user, such as the system manager, performed a manipulation such as maintenance, using the system maintenance device 6. The event-zone definition modification unit 122 receives modification content which is set in the system maintenance 6 via network 8, and updates the content of the event-zone definition storage unit 171 of the event definition storage unit 17. Similarly, the event-process definition modification unit 123 updates the content of the event-zone definition storage unit 172 of the event definition storage unit 17 based on the modification content which is set in the system maintenance 6. The details of each process will be described hereinafter.

Figure 7:
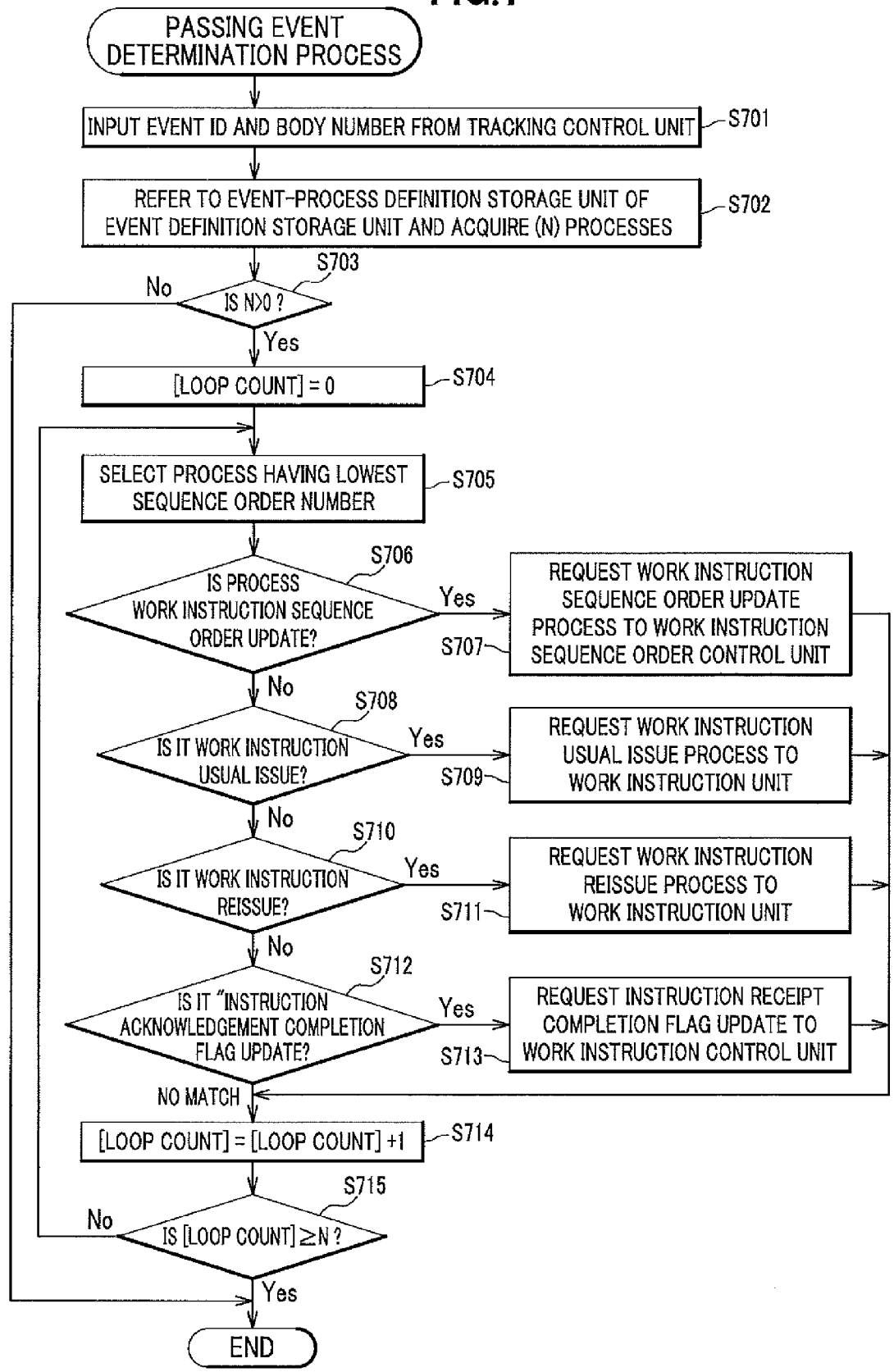
FIG. 7 depicts a flowchart showing an exemplary passing event determination process according to an embodiment of the present invention.

FIG. 7 is a flowchart showing an example of the passing event determination process by the passing event determination unit 121 of the conductor unit 12. First, an event ID and a body number included in the passing signal are input from the tracking control unit 11 (step S701). Then, in order to identify the process that matches with the received event ID, the event-process definition storage unit 172 of the event definition storage unit 17 is referred to acquire the process, the sequence order, and the process mode defined in the record for the matched event ID 1722, and the number of the matched items is assumed as N (step S702). Next, whether the number of the processes (N) for the process corresponding to the acquired matched ID is greater than or equal to one or not is determined (step S703). As a result of the determination, if there are one or more items, the process proceeds to the next step, and if there is no item, the process ends.

As a result of the determination made in step S703, if there are one or more processes that correspond with the matched ID, the initial value for the loop count is set to 0 (step S704). Then, in order to perform the matched processes one by one according to the sequence order for the acquired process, one process having the lowest sequence order number is selected among the processes of the matched ID (step S705). Next, whether the selected process is "work instruction sequence order update" or not is determined (step S706), and if the selected process is "work instruction sequence order update", a process for "work instruction sequence order update" is requested to the work instruction sequence order control unit 13 (step S707). Then, whether the selected process is "work instruction usual issue" or not is determined (step S708), and if the selected process is "work instruction usual issue", a process for "work instruction usual issue" process is requested to the work instruction unit 14 (step S709). Then, whether the selected process is "work instruction reissue" or not is determined (step S710), and if the selected process is "work instruction reissue", a process for "work instruction reissue" is requested to the work instruction unit (step S711). Next, whether the selected process is instruction acknowledgement completion flag update or not is determined (step S712). If the selected process is instruction acknowledgement completion flag update, a process for instruction acknowledgement completion flag update is requested to the work instruction sequence order control unit 13 (step S713). In other words, the process control device 1 stores and controls a status that it has been confirmed that the work instruction information has been received. If the selected process does not match with either of the above, no processing is performed and the process proceeds to the next step. After the processing is completed, the count is incremented as in [loop count]=[loop count]+1 (step S714), and whether the loop count is greater than or equal to N, which is the number of processes acquired in step S702, or not is determined (step S715). If the loop count is less than N, the process returns to step S705 and repeats the processing. If the loop count is greater than or equal to N, the process ends.

Here, as shown in FIG. 21B, if the event-process definition storage unit 172 is defined and, for example, if it is [event ID]=1, there are two matched processes. That is, for [sequence order]=1, process=[work instruction sequence order update], and for [sequence order]=2, process=[work instruction usual issue for sequence order]. Therefore, the process for "work instruction sequence order update" first matches, and processing is requested to the work instruction sequence order control unit 13, and then, the process for "work instruction usual issue" matches, and processing is requested to the work instruction unit 14. Although the processing that corresponds to the event ID is determined and the matched process is requested to each processing unit in the present process, the kind of processing shown in FIG. 7 is only an example. The kind of processing may be determined to suit the actual work process that applies to the process control system according to the present embodiment and the passing event determination process may be created accordingly.

Figure 8:
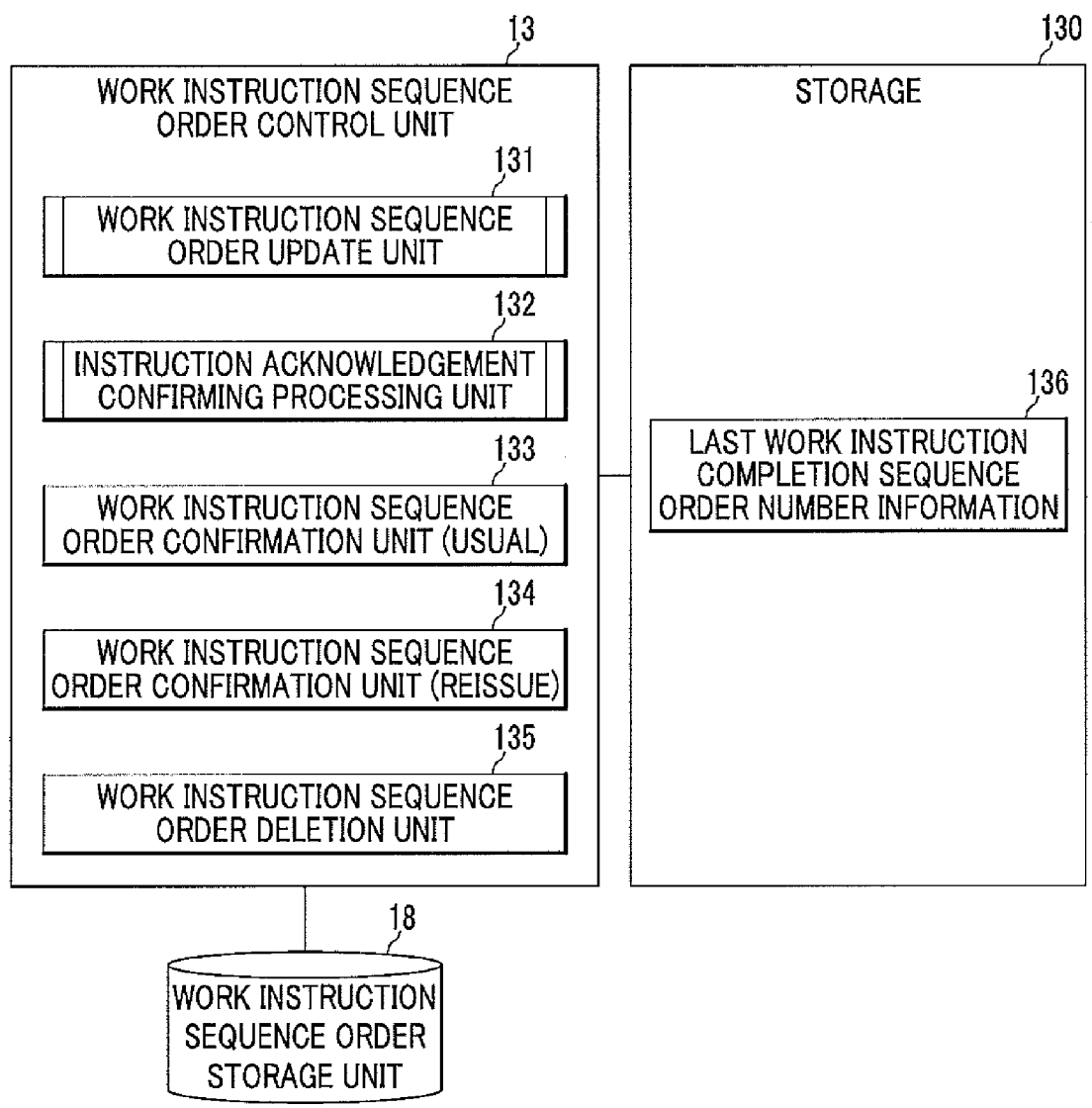
FIG. 8 depicts a block diagram showing an exemplary schematic arrangement of a work instruction sequence order control unit according to an embodiment of the present invention.

FIG. 8 is a diagram schematically showing an exemplary arrangement of the work instruction sequence order control unit 13. The work instruction sequence order control unit 13 controls the sequence order of the work instruction in accordance with the process request received from the conductor unit 12. The work instruction sequence order control unit 13 includes a work instruction sequence order update unit 131, an instruction acknowledgement confirming processing unit 132, a work instruction sequence order confirmation unit (normal) 133, a work instruction sequence order confirmation unit (reissue) 134, and a work instruction sequence order deletion unit 135. In addition, last work instruction completion sequence order number information 136 which stores information during processing is provided in the storage unit 130 such as a main memory or an external storage device. A work instruction sequence order update unit 131 updates information of the work instruction sequence order storage unit 18 in response to a request from the passing event determination unit 121 of the conductor unit 12 to process "work instruction sequence order update". The instruction acknowledgement confirming processing unit 132 updates information of the work instruction sequence order storage unit 18 in response to a request from the passing event determination unit 121 of the conductor unit 12 to process "instruction acknowledgement flag update". The work instruction sequence order confirmation unit (normal) 133 replies with the matched body number in response to a request from the work instruction unit 14 to acquire the body number which should be issued the work instruction sheet next. The work instruction sequence order confirmation unit (reissue) 134 replies with the matched body number in response to a request from the work instruction unit 14 to acquire the body number which should be reissued. The work instruction sequence order deletion unit 135 deletes the instructed information in response to a request from the system maintenance device 6 to delete the work instruction sequence order information which became unneeded. The details of each process and information of the storage unit will be described hereinafter.

FIG. 9 shows an example of a structure of the last work instruction completion sequence order number information 136. In the last work instruction completion sequence order number information 136, the sequence order number for each zone which the work instruction unit 14 issues the work instruction last is registered. The last work instruction completion sequence order number information 136 includes a work instruction sequence order zone ID 1361, and a last work instruction completion sequence order number 1362 in which a sequence order number that issued the work instruction of the zone ID last is registered.

Figure 10:
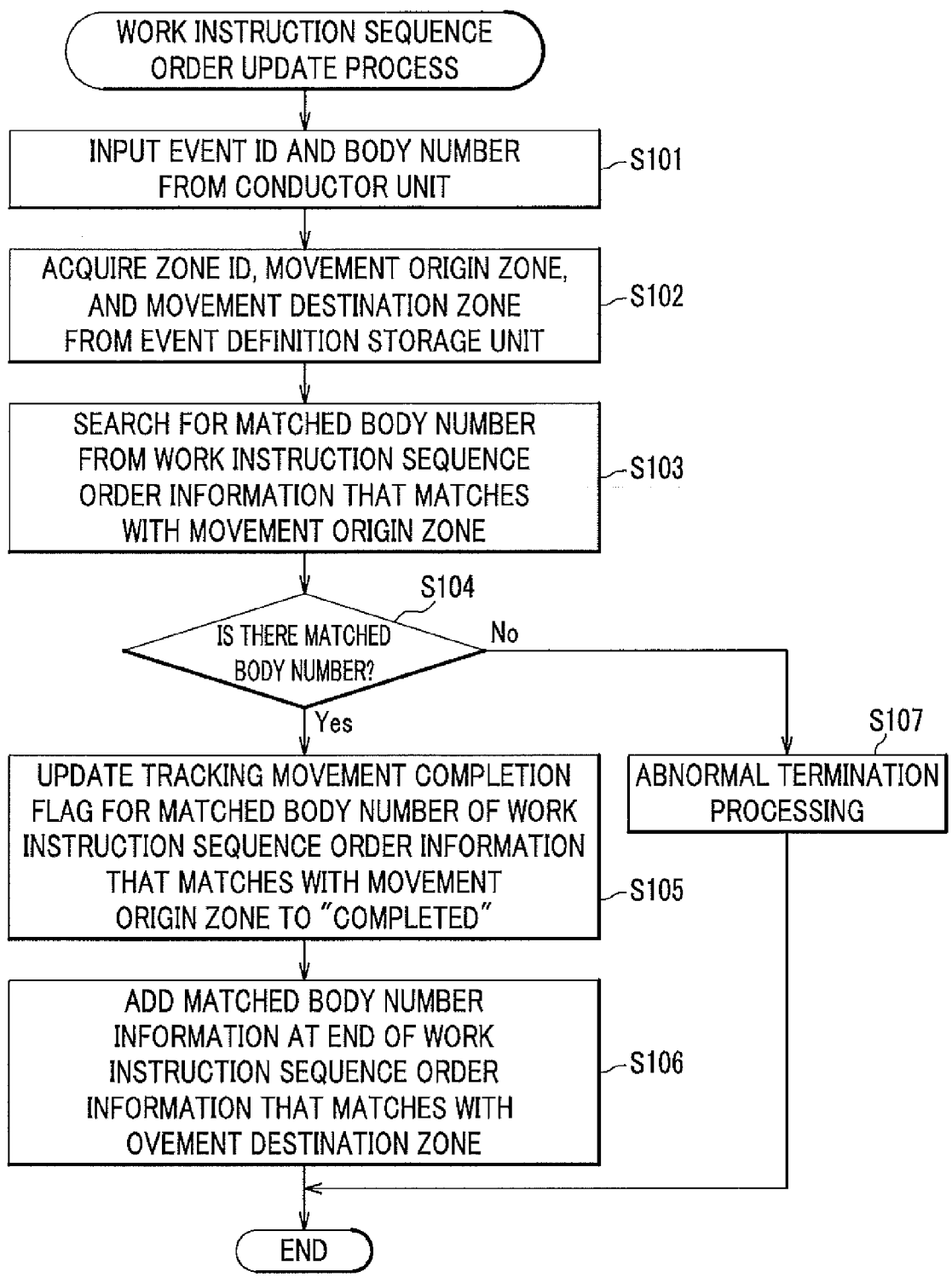
FIG. 10 depicts a flowchart showing an exemplary work instruction sequence order update process according to an embodiment of the present invention.

FIG. 10 is a flowchart showing an example of the work instruction sequence order update process by the work instruction sequence order update unit 131 of the work instruction sequence order control unit 13. First, an event ID and a body number are input from the conductor unit 12 (step S101). Then, the event-zone definition storage unit 171 of the event definition storage unit 17 is referred, as well as the tracking zone ID 1712, the movement origin zone 1715, and the movement destination zone 1716, for the record having an event ID 1711 which matches with the event ID (step S102) are obtained. Next, the work instruction sequence order storage unit 18 for the zone which matches with the acquired movement origin zone ID in the work instruction sequence order storage unit 18 is referred, and the body number 182 that matches with the input body number is searched for (step S103). Then, as a result of the search, whether there is a matched body number or not is determined (step S104).

As a result of the determination, if there is a matched body number, the tracking movement completion flag 183 of the matched body number for the work instruction sequence order information in the zone that matches with the movement origin zone ID in the work instruction sequence order storage unit 18 is updated to "completed" (step S105). Then, information for the matched body number is added at the end of the work instruction sequence order information for the zone that matches with the movement destination zone ID. As for the sequence order number 181, a value that added one to the maximum value of the sequence order number in the zone which is "registration-completed" is set (step S106). As a result of the determination made in step S104, if there is no matched body number, abnormal terminal processing is performed (step S107) and the process ends.

Figure 11:
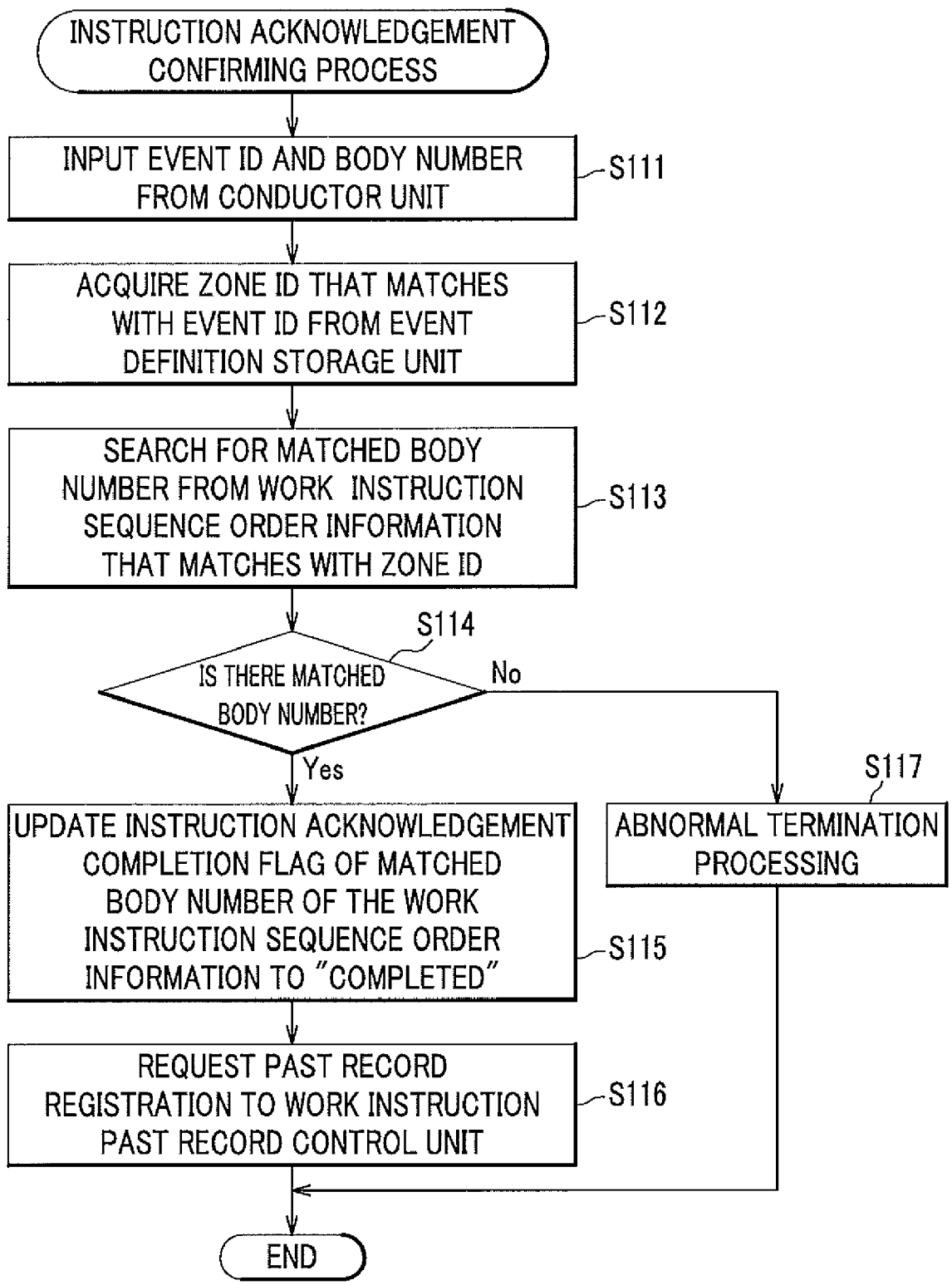
FIG. 11 depicts a flowchart showing an example of an instruction acknowledgement confirming process according to an embodiment of the present invention.

FIG. 11 is a flowchart showing an instruction acknowledgement confirming process by the instruction acknowledgement confirming processing unit 132 of the work instruction sequence order control unit 13. First, an event ID and a body number are input from the conductor unit 13 (step S111), then, the event-zone definition storage unit 171 of the event definition storage unit 17 is referred to acquire the tracking zone ID 1712 of the record of the event ID 1711 that matches with the inputted event ID (step S112). Next, the work instruction sequence order information for the zone that matches with the acquired tracking zone ID is referred to search for the body number 182 that matches with the inputted body number (step S113). Then, as a result of the search, whether there is a matched body number or not is determined (step S114).

As a result of that determination, if there is a matched body number, the instruction acknowledgement completion flag 184 of the matched body number for the work instruction sequence order information of the zone that matches with the tracking zone ID in the work instruction sequence order storage unit 18 is updated to "completed" (step S115). Then, a registration of the past record is requested to the work instruction past record control unit 15 (step S116). As a result of the determination made in step S114, if there is no matched body number, abnormal termination processing is performed (step S117), and the process ends.

Next, the processing of the work instruction sequence order confirmation unit (normal) 133 will be described. The work instruction sequence order confirmation unit (normal) 133 replies with a matched body number in response to a request from the work instruction unit 14 to acquire the body number which should be issued by the work instruction sheet next. The work instruction sequence order confirmation unit (normal) 133 first refers to the last work instruction completion sequence order number information 136 to acquire the value of the last work instruction completion sequence order number of the matched work instruction sequence order zone ID. Then, the work instruction sequence order information of the matched work instruction sequence order zone ID of the work instruction sequence order storage unit 18 is searched for in an ascending order of the sequence order number. Then afterwards, a body number having a lowest sequence order number is acquired among those having a value greater than or equal to the acquired last work instruction completion sequence order number+1, and information having the instruction acknowledgement completion flag as not "completed", and replies to the work instruction unit 14.

Next, processing of the work instruction sequence order confirmation unit (reissue) 134 will now be described. The work instruction sequence order confirmation unit (reissue) 134 receives a request to acquire the body number which should be reissued from the work instruction unit 14, and replies to the matched body number. The work instruction sequence order confirmation unit (reissue) 134 first refers to the last work instruction completion sequence order number storage unit 136 to acquire a value of the last work instruction completion sequence order number of the work instruction sequence order zone ID. Then, the work instruction sequence order information of the matched work instruction sequence order zone ID of the work instruction sequence order storage unit 18 is searched for in an ascending order of the sequence order number. Thereafter, a body number which has a value less than or equal to a value of the last work instruction completion sequence order number, and which has the instruction acknowledgement completion flag as not "completed" is acquired, and is replied to the work instruction unit 14. Here, the matched item may be more than one, so that all of the body numbers which match with the condition are acquired and if they are more than one, the body numbers are sorted in an ascending order of the sequence order number to be replied.

Now, the processing of the work instruction sequence order deletion unit 135 will be described. The work instruction sequence order deletion unit 135 deletes information which is requested to be deleted from the work instruction sequence order storage unit 18 in response to a request from the system maintenance device 6 via the network 8 to delete the work instruction sequence order information which became unneeded. The work instruction sequence order deletion unit 135 deletes information having the instruction acknowledgement completion flag as "completed" among the requested information. Here, those which are "completed" are presumed to be not subjected to the reissue of the work instruction sheet. Since there are cases where the reissue is requested even if the instruction acknowledgement completion flag is "completed", the determination as to whether it is subjected to the reissue of the work instruction sheet or not will be performed by the field worker or the system manager. Therefore, the deletion of the information is performed manually from the system maintenance device 6 by user determination, not by automatically by the system. The deletion request from the system maintenance device 6 may be performed as needed, and the actual deletion process may be performed by the work instruction sequence order deletion unit 135 at timing when the production line is stopped, such as during lunch recess or at night.

Figure 12:
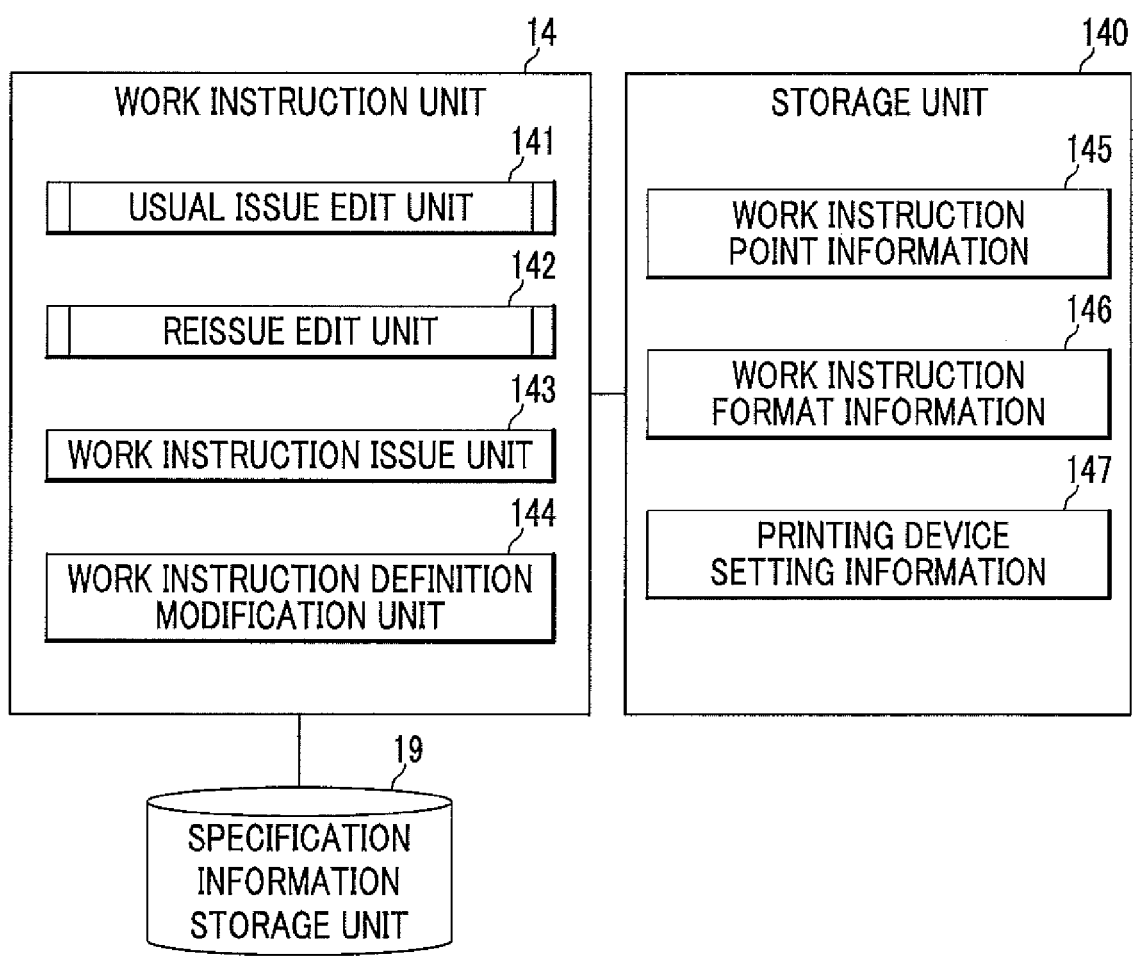
FIG. 12 depicts a block diagram showing an exemplary schematic arrangement of a work instruction unit according to an embodiment of the present invention.

FIG. 12 shows an example of a structure of the work instruction unit 14. The work instruction unit 14 performs the editing process of the work instruction and the issue control of the work instruction in accordance with the process request received from the conductor unit 12. The work instruction unit 14 includes a usual issue edit unit 141, a reissue edit unit 142, a work instruction issue unit 143, a work instruction definition modification unit 144, and a storage unit 140 in a main memory and an external storage device, etc., for storing information for use in each process of the work instruction unit 14. The storage unit 140 includes work instruction point information 145, work instruction format information 146, and printing device setting information 147. Usual issue edit unit 141 receives a request from the passing event determination unit 121 of the conductor unit 12 to process the work instruction usual issue and creates work instruction sheet data. The reissue edit unit 142 receives a request from the passing event determination unit 121 of the conductor unit 12 to process the work instruction reissue and to create the work instruction sheet data for the reissue. The work instruction issue unit 143 prints out the work instruction sheet based on the work instruction sheet data created by the request from the usual issue edit unit 141 or the reissue edit unit 142, and requests an update on the past record information to the work instruction past record control unit 15. The work instruction definition modification unit 144 performs control of the information stored in the storage unit 140. The details of each process and the information in the storage unit will be described hereinafter.

Figure 13A:
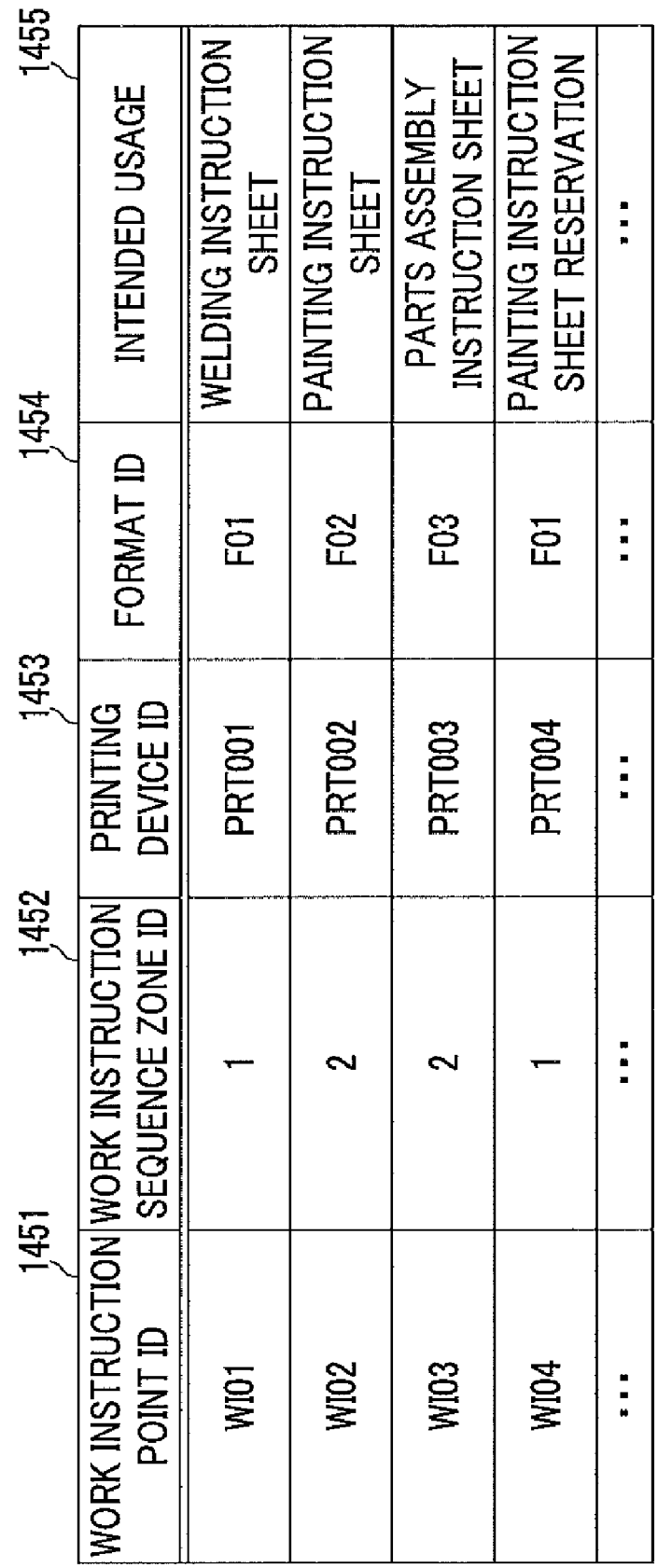

FIGS. 13A to 13C show an example of a structure of information in the storage unit 140. FIG. 13A shows an example of a structure of the work instruction point information 145, FIG. 13B shows an example of a structure of the work instruction format information 146, and FIG. 13C shows an exemplary arrangement of the printing device setting information 147. The details of the information will be described with reference to FIGS. 13A to 13C.

The details of the work instruction point information 145 will be described with reference to FIG. 13A. The relationship between each work instruction point and the printing device is registered in the work instruction point information 145. The work instruction point is an ID which represents a location where the printing device that issues the work instruction sheet is located, and the work instruction sheet in a pre-designated format is issued from each printing device. Moreover, the work instruction sheet in a plurality of formats may be issued from a single printing device. Accordingly, necessary information is registered in the work instruction point information 145 for issuing the work instruction sheet. The work instruction point information 145 includes a work instruction point ID 1451 which identifies the work instruction point, and a work instruction sequence order zone ID 1452 to which the work instruction point belongs. Furthermore, it includes the printing device ID 1453 for the issue destination, the format ID 1454 of the work instruction sheet to be issued, and the intended usage 1455 of the work instruction sheet, to form a single record.

The details of the work instruction format information 146 will be described with reference to FIG. 13B. The information regarding the format of the work instruction sheet is registered in the work instruction format information 146. The work instruction format information 146 includes the format ID 1461 which identifies the format, the format name 1462 which is a name of the format and the format file 1463 in which physical format of the file is registered, to form a single record.

The details of the printing device setting information 147 will be described with reference to FIG. 13C. The information regarding the setting of the printing device is registered in the printing device setting information 147. The printing device setting information 147 includes the printing device ID 1471 which identifies the printing device, the manufacturer 1472 in which the name of the manufacturer of the printing device is registered, and the IP address 1473 of the printing device, to form a single record.

Figure 14:
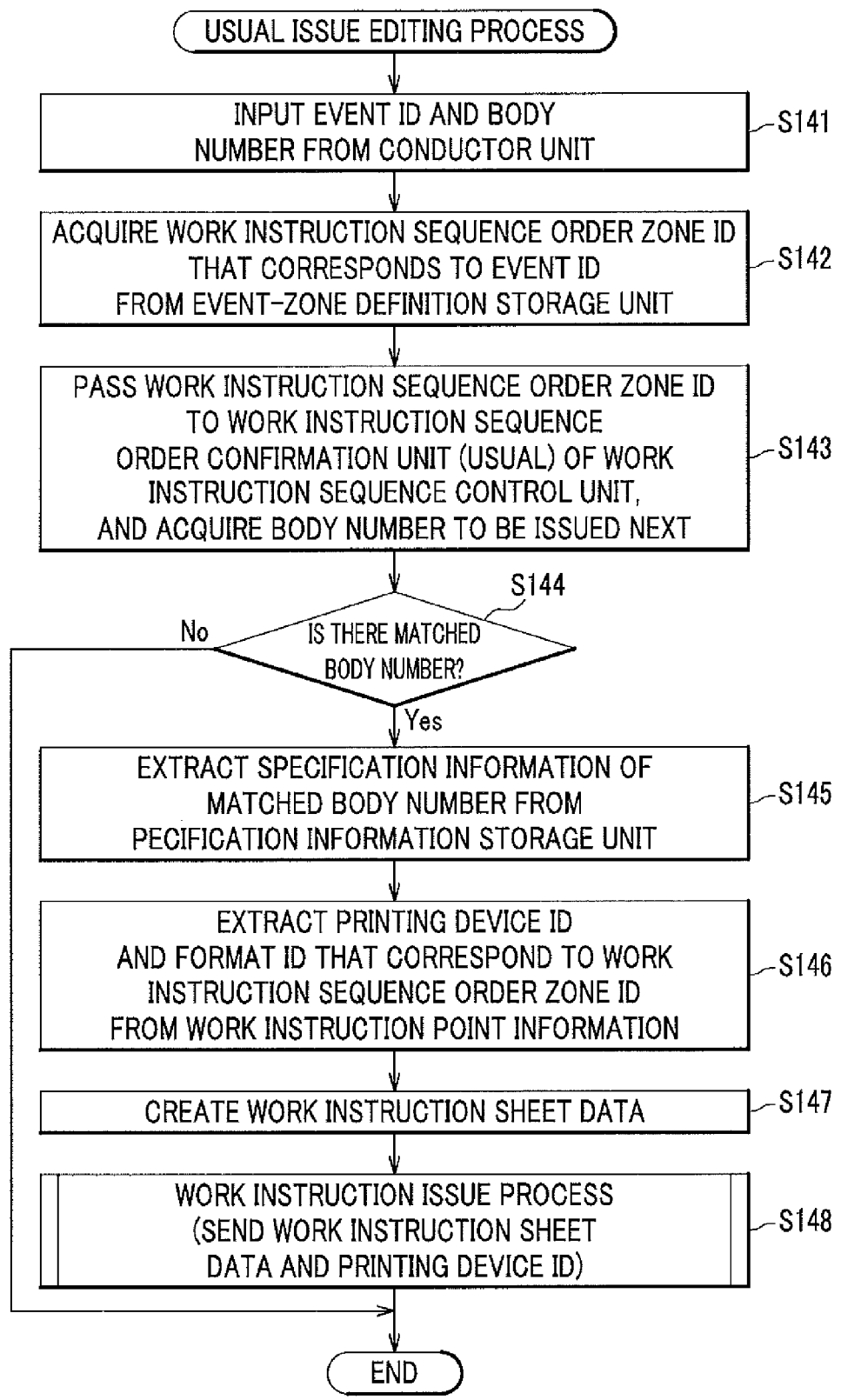
FIG. 14 depicts a flowchart showing an exemplary usual issue editing process according to an embodiment of the present invention.

FIG. 14 is a flowchart showing an example of the usual issue editing process by the usual issue edit unit 141 of the work instruction unit 14. First, the event ID and the body number are input from conductor unit 12 (step S141). Then, the event-zone definition storage unit 171 of the event definition storage unit 17 is referred to acquire the work instruction sequence order zone ID 1713 of the record of the event ID 1711 that matches with the inputted event ID (step S142). Next, the acquired work instruction sequence order zone ID is passed onto the work instruction sequence order confirmation unit (normal) 133 of the work instruction sequence order control unit 13, and the body number to be issued in the work instruction sheet next in the zone is acquired (step S143). Then, the matched body number is determined (step S144).

As a result of the determination, if there is a matched body number, the specification information storage unit 19 is referred to acquire the specification information that corresponds to the matched body number (step S145). Next, the work instruction point information 145 is referred to acquire the printing device ID 1453 that corresponds to the acquired work instruction sequence order zone ID, and the format ID 1454 (step S146). Next, the work instruction format information 146 is referred to acquire the format file 1463 that matches the acquired format ID to create the work instruction sheet data (step S147). Then, the created work instruction sheet data and the printing device ID are set to the work instruction issue unit 143, to request the work instruction issue process (step S148). As a result of the determination made in step S144, if there is no matched body number, the process ends.

Figure 15:
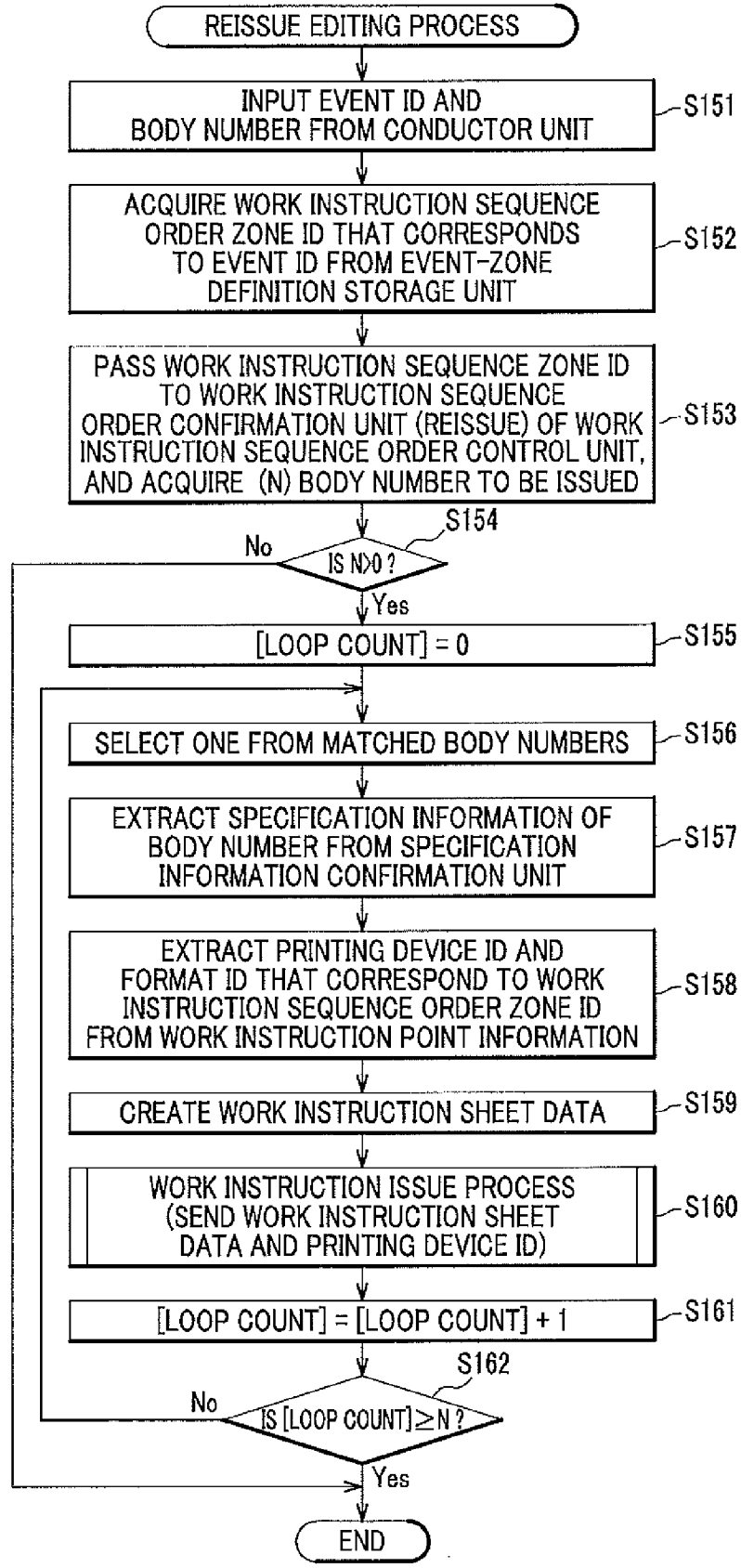
FIG. 15 depicts a flowchart showing an exemplary reissue editing process according to an embodiment of the present invention.

FIG. 15 is a flowchart showing an example of the reissue editing process by the reissue edit unit 142 of the work instruction unit 14. First, the event ID and the body number are input from the conductor unit 12 (step S151). Then, the event-zone definition storage unit 171 of the event definition storage unit 17 is referred to acquire the work instruction sequence order zone ID 1713 for the record of the event ID 1711 that matches with the inputted event ID (step S152).

Next, the acquired work instruction sequence order zone ID is passed on the work instruction sequence order confirmation unit (reissue) 134 of the work instruction sequence order control unit 13 to acquire the body number that is subjected to be issued, and the number of the items is assumed as N items (step S153). Then, whether the number of the items for the matched body number (N items) is greater than or equal to one or not is determined (step S154). As a result of the determination, if there are one or more items, the process proceeds to the next step, and if it is 0 items, the process ends.

As a result of the determination, if there are one or more matched body numbers, the initial value of the loop count is set to 0 (step S155). Then, in order to perform the matched processes one by one for the acquired body number, one item is selected from the matched body numbers (step S156). Next, the specification information storage unit 19 is referred to acquire the specification information that corresponds to the body number (step S157). Then, the work instruction point information 145 is referred to acquire the printing device ID 1453 which corresponds to the acquired work instruction sequence order zone ID, and the format ID 1454 (step S158). Next, the work instruction format information 146 is referred to acquire the format file 1463 which matches the acquired format ID and to create the work instruction sheet data (step S159). Then, the created work instruction sheet data and the printing device ID are sent to the work instruction issue unit 143 to request the work instruction issue process (step S160). After the process is completed, the count is incremented as in [loop count]=[loop count]+1 (step S161), and whether the loop count is greater than or equal to N, which is the number of items acquired in step S153, is determined (step S162). If the loop count is less than N items, the process returns to step S156 and repeats the processing. If the loop count is greater than or equal to N items, the process ends.

Figure 16:
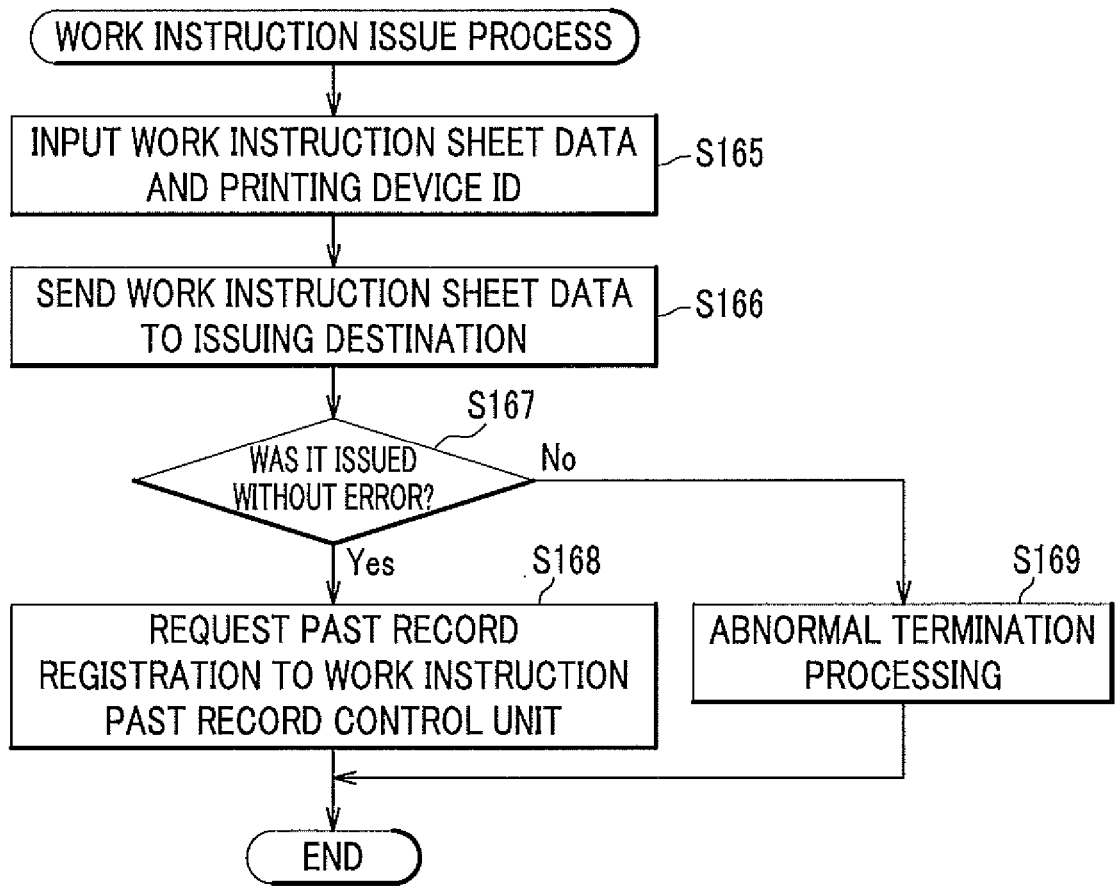
FIG. 16 depicts a flowchart showing an exemplary work instruction issuing process according to an embodiment of the present invention.

FIG. 16 is a flowchart showing an example of the work instruction issue process by the work instruction issue unit 143 of the work instruction unit 14. First, the work instruction sheet data and the printing device ID are input from the usual issue edit unit 141 or the reissue edit unit 142 (step S165). Then, the IP address 1473 that matches with the printing device ID is referred from the printing device setting information 147, and the work instruction sheet data is sent with the printing device of the matched IP address as an issue destination to request the issue (step S166). As a result, whether it was normally issued or not is determined (step S167). As a result of the determination, if it was normally issued, the registration for the past record is requested to the work instruction past record control unit 15 (step S168). On the other hand, if it was not normally issued as a result of the determination, abnormal termination processing is performed (step S169) and the process ends.

Now, the processing of the work instruction definition modification unit 144 will be described. The work instruction definition modification unit 144 controls the content of the information defined in a storage unit 140 of the work instruction unit 14. The work instruction definition modification unit 144 modifies the work instruction point information 145, the work instruction format information 146, and the printing device setting information 147 by the user, such as a system manager, manipulating with the system maintenance device 6 and requesting via the network 8.

For example, in the case where the printing device 3 is to be replaced, the work instruction usual issue can be stopped temporarily by modifying the process mode 1725 of the event-process definition storage unit 172 from "OPERATING" to "WAIT" 1726. Accordingly, the replacement of the printing device is made possible during the time when temporarily stopping the issue of the work instruction sheet. Furthermore, at this time, the information of the printing device in the printing device setting information 147 which needs to be replaced can be modified. Moreover, in the case where a printing device is to be added, a printing device can be added and printing can be started again by directing the new printing device to the work instruction point information 145 as an issue destination.

Accordingly, in accordance with the present embodiment, if performing an extension, etc., of the facility such as a printing device, the production processing can be performed without stopping and the influence to the worker can be reduced to the minimum.

Figure 17:
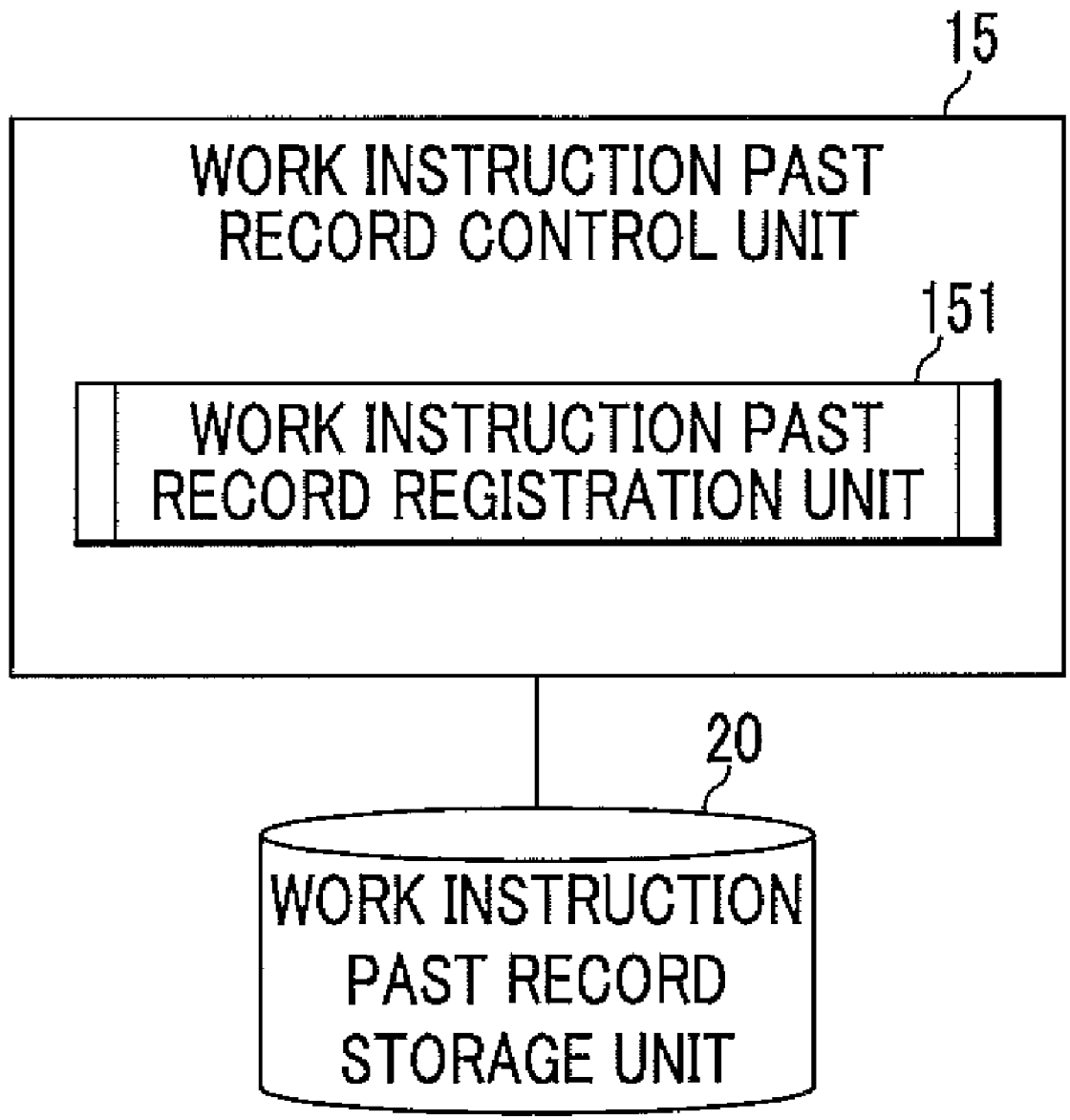
FIG. 17 depicts a block diagram showing an exemplary schematic arrangement of a work instruction past record control unit according to an embodiment of the present invention.

FIG. 17 is an example of a structure of the work instruction past record control unit 15. The work instruction past record control unit 15 includes a work instruction past record registration unit 151 which manages that the work instruction issue of the work instruction unit 14 has normally ended and that the worker has received the work instruction sheet. The past record information of work instruction is registered and managed in the work instruction past record storage unit 20 to be controlled.

Figure 18:
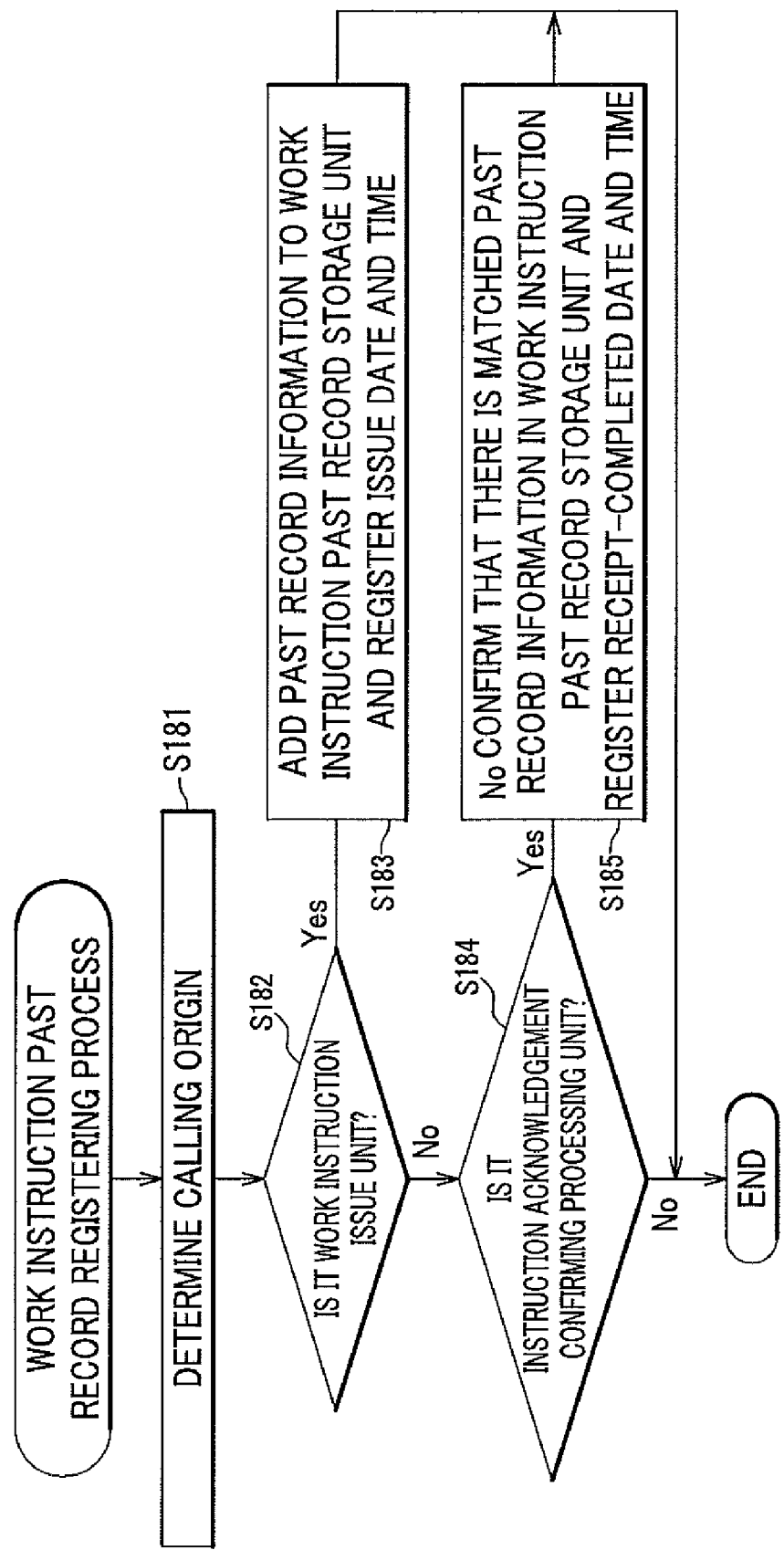
FIG. 18 depicts a flowchart showing an exemplary work instruction past record registering process according to an embodiment of the present invention.

FIG. 18 is a flowchart showing an example of the work instruction past record registering process by the work instruction past record registration unit 151 of the work instruction past record control unit 15. First, the calling origin of the process is determined (step S181). As a result of the determination of the calling origin, if the calling origin is the work instruction issue unit 143 of the work instruction unit 14 (step S182), the past record information thereof is added to the work instruction past record storage unit 20. As for the past record information, the work instruction point ID 201, the body number 202, and the issue date and time 203 are registered (step S183). As a result of the determination of the calling origin, if the calling origin is the instruction acknowledgement confirming processing unit 132 of the work instruction sequence order control unit 13 (step S184), whether there is past record information for the work instruction point ID 201 and the body number 202 in the work instruction past record storage unit 20 is confirmed and the "receipt-completed" date and time 204 is registered (step S185).

Figure 26:
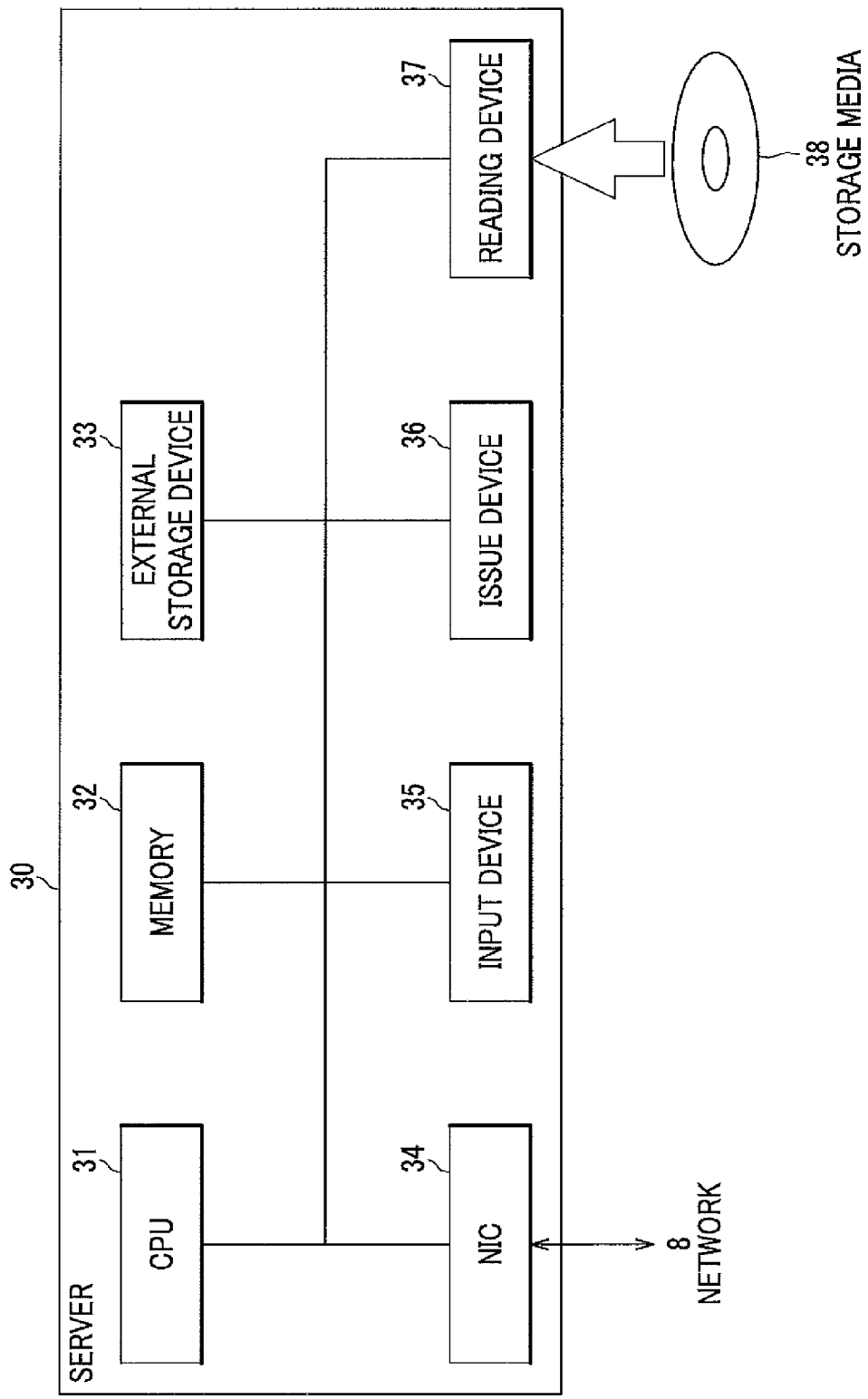
FIG. 26 shows an exemplary hardware arrangement of a process control device according to an embodiment of the present invention.

FIG. 26 shows an example of a hardware structure of the process control device 1 according to the embodiment of the present invention. The above-described process control device 1 is implemented with a program that performs the matched processing for each processing unit to, for example, an electronic computer such as a server 30 shown in FIG. 26, and the information for each storage unit is stored in storage unit such as a memory 32 and an external storage device 33, and the processing is achieved by using a computation processing device, etc., such as CPU (Central Processing Unit) 31 provided in the electronic computer.

Figure 28B:
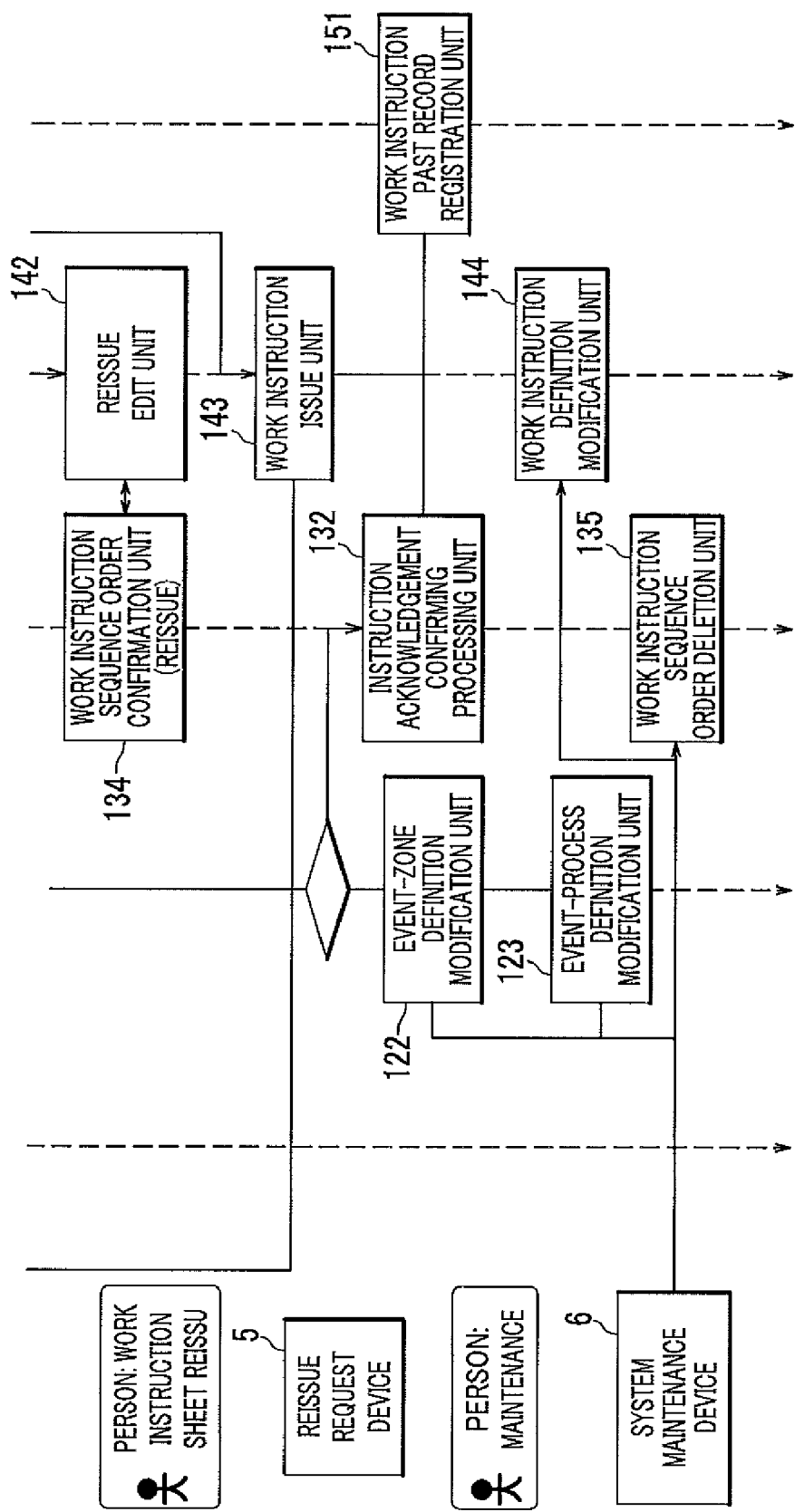

FIGS. 28A and 28B show a flowchart of an overall process of the process control system in accordance with an embodiment of the present invention. In FIGS. 28A and 28B, the correlation between the processes in the above-described processing units is shown, and arrows show which processing unit is being requested in the process requested from the processing units. For example, the passing signal that is notified from the passing signal transmission device 2 is received at the signal reception unit 111 of the tracking control unit 11, as the body in the production line moves. Furthermore, by manipulating the work completion transmission device 4 after the worker who received the issued work instruction sheet 7 from the printing device 3 attaches the work instruction sheet onto the body, etc., the work completion notification is transmitted and received at the signal reception unit 111. Similarly, in a case where the reissue of the work instruction sheet is requested by a determination of the worker, etc., the reissue request is transmitted by the worker manipulating the reissue request device 5 and is received at the signal reception unit 111. The information received at the signal reception unit 111 is notified to the conductor unit 12. Then, at the passing event determination unit 121, the process is bifurcated depending on the content of the notified event, and the processing such as an issue of the work instruction sheet is performed by notifying the event to the processing units.

In the present invention, by providing with the work instruction sequence order control unit 13, the work completion transmission device 4, and the reissue request device 5, which did not exist conventionally, the work instruction sequence order information can be controlled separately from the tracking information and the reissue of the work instruction sheet which is needed for the field worker can be easily done. Furthermore, it has become possible to control information such as the issue sequence order of the work instruction sheet and the instruction receipt situation of the worker. Therefore, the addition of a printing device and the control of the reissue of the work instruction sheet, such as when reissuing during a malfunction, can be easily done, the influence on the production process can be made small, and the operation rate can be improved.

The invention claimed is:

1. A process control device comprising:
   a tracking control unit that receives event information, transmitted from the passing signal transmission device, notifying that a product being produced in a production line including a plurality of zones each comprising a production process passes a predetermined location, the event information including an ID of the product and controls a status of current location and sequence order of the product on the basis of the event information transmitted from the passing signal transmission device, wherein the sequence order is controlled for each of the zones;
   a conductor unit that determines a process that corresponds to the ID of the product in the event information received by the tracking control unit and generates a request for performing the determined process;
   a work instruction unit that issues the work instruction for the product being produced in the production line in response to the request from the conductor unit;
   a work instruction past record control unit that controls past record of the work instructions in response to an issue of the work instruction by the work instruction unit;
   a work instruction sequence order control unit that controls a sequence order of the work instructions issued by the work instruction unit in either order of the status of sequence order of the product or a status different from the status of sequence order of the product;
   a work instruction sequence order storage unit that stores information of the sequence order of the work instructions, wherein the work instruction sequence order control unit controls the work instruction sequence order storage unit; and
   a reissue requesting device that transmits event information that notifies a reissue request for reissuing the work instruction in response to the user,
   wherein the tracking control unit receives event information transmitted from the reissue requesting device, and generates a reissue request for the reissue to the work instruction unit,
   wherein the work instruction unit reissues the work instruction in response to the reissue request with reference to information of the sequence order of the work instructions in the work instruction sequence order storage unit.

2. The process control device according to claim 1, further comprising a work completion transmission device that transmits event information that notifies that the work instruction issued a work instruction unit has been received by a user, wherein
the tracking control unit receives the event information transmitted from the work completion transmission device, and
the work instruction sequence order control unit stores a status of whether acknowledgement of a reception of the work instruction is completed or not in the work instruction sequence order storage unit based on the event information transmitted from the work completion transmission device.

3. The process control device as claimed in claim 1, further comprising:
a transmitter for transmitting the event information notifying that the product being produced in the production line including a plurality of the production processes passes the predetermined location.

4. A method of controlling process comprising:
(a) receiving event information transmitted from a passing signal transmission device, notifying that a product being produced in a production line including a plurality of zones each comprising a production process passes a predetermined location, the event information including an ID of the product and controlling status of current location and sequence order of the product on the basis of the event information transmitted from the passing signal transmission device, wherein the sequence order is controlled for each of the zones;
(b) determining a process that corresponds to the ID of the product in the event information received at the tracking control unit and generating a request for performing the determined process;
(c) issuing the work instruction for the product being produced in the production line in response to the request generated in step (b);
(d) storing and controlling information of sequence order of the issued work instructions into the work instruction sequence order storage unit, wherein the sequence order of the work instructions is controlled in either order of the status of sequence order of the product or a status different from the status of sequence order of the product; and
(e) receiving a reissue request notification of the work instruction from a user, and reissuing the work instruction with reference to information of the work instruction sequence order storage unit.

5. A process control system comprising:
a passing signal transmission device that transmits event information notifying that a product being produced in a production line including a plurality of zones each comprising a production process passes a predetermined location, the event information including an ID of the product;
a process control device that receives the event information transmitted by the passing signal transmission device, issues a predetermined work instruction in accordance with the ID of the product, and controls a status of sequence order of the product, wherein the sequence order is controlled for each of the zones;
a work completion transmission device that notifies that the work instruction from the process control device has been received;
a reissue requesting device that transmits event information that notifies a reissue request for reissuing the work instruction in response to a user, wherein the process control device stores and controls information of a sequence order of the work instruction, and controls a status that it has been confirmed that the work instruction information has been received on the basis of the information from the work completion transmission device, and wherein the sequence order of the work instruction is controlled in either order of the status of sequence order of the product or a status different from the status of sequence order of the product.

* * * * *